US007814882B2

(12) United States Patent
Sakita

(10) Patent No.: US 7,814,882 B2
(45) Date of Patent: Oct. 19, 2010

(54) ROTARY PISTON ENGINE

(76) Inventor: Masami Sakita, P.O. Box 61089, Palo Alto, CA (US) 94306-1089

( * ) Notice: Subject to any disclaimer, the term of this patent is extended or adjusted under 35 U.S.C. 154(b) by 259 days.

(21) Appl. No.: 12/002,484

(22) Filed: Dec. 17, 2007

(65) Prior Publication Data

US 2008/0098982 A1    May 1, 2008

Related U.S. Application Data

(63) Continuation-in-part of application No. 11/485,623, filed on Jul. 13, 2006, now abandoned.

(51) Int. Cl.
*F02B 53/00* (2006.01)

(52) U.S. Cl. .................. 123/241; 123/245; 418/35; 418/36; 418/37; 418/38; 74/434

(58) Field of Classification Search ............ 123/241, 123/245; 418/35–38; 74/434, 437
See application file for complete search history.

(56) References Cited

U.S. PATENT DOCUMENTS

| 1,328,410 | A |   | 1/1920 | Weed |           |
|-----------|---|---|--------|------|-----------|
| 3,144,007 | A |   | 8/1964 | Kauerts |        |
| 3,244,156 | A | * | 4/1966 | Curtiss | 123/245 |
| 3,396,632 | A | * | 8/1968 | Leblanc | 123/245 |
| 3,822,971 | A | * | 7/1974 | Chahrouri | 123/245 |
| 4,057,374 | A |   | 11/1977 | Seybold |       |
| 5,381,766 | A | * | 1/1995 | Sakita | 123/245 |
| 5,622,149 | A |   | 4/1997 | Witty |          |
| 5,970,924 | A | * | 10/1999 | Pyon | 123/18 A |
| 6,305,345 | B1 |   | 10/2001 | Bakhtine |     |
| 6,349,679 | B1 | * | 2/2002 | Mashimo et al. | 123/18 R |
| 6,446,595 | B1 |   | 9/2002 | Sakita |       |
| 6,705,202 | B2 |   | 3/2004 | Harcourt et al. | |
| 6,895,923 | B1 | * | 5/2005 | Jones | 123/245 |
| 7,472,676 | B2 | * | 1/2009 | McCoin et al. | 123/241 |

OTHER PUBLICATIONS

Masami Sakita, a cat-and-mouse type rotary engine: engine design and performance evaluation, Journal of Automobile Engineering, Aug. 2006, pp. 1139-1151, vol. 220.
The Granville Bradshow Engine, The Motor, p. 954, Jan. 18, 1956 (Material lost, Please see the attached copy of citation in U.S. Appl. No. 11/485,623).

* cited by examiner

*Primary Examiner*—Thomas E Denion
*Assistant Examiner*—Mary A Davis

(57) ABSTRACT

An internal combustion engine including a working chamber assembly housing, intake and exhaust ports, a pair of piston assemblies each of which assemblies includes at least one pair of diametrically opposed pistons within the working chamber assembly housing rotatable about a rotational axis of said piston assemblies, means for interconnecting said first and second piston assemblies for variable speed rotation in the same direction during recurrent periods of rotation, wherein the piston having a piston head and a piston vessel, the piston head of one piston assembly received by the piston vessel of the other piton assembly to form a working chamber. The connecting means includes a pair of internal gears, a plurality of planetary gears and means for transmitting variable speed rotation, a main transmission gear set, and a pair of auxiliary means that is connected to the piston assemblies.

18 Claims, 27 Drawing Sheets a)

b)

ROTARY PISTON ENGINE

RELATED APPLICATION

This application is a continuation-in-part of now-abandoned Application Ser. No. 11/485,623 filed on Jul. 13, 2006 entitled "Rotary Piston Engine."

FIELD OF THE INVENTION

This invention relates generally to rotary piston engines and in particular to rotary piston engines that include first- and second-piston assemblies interconnected for alternate variable-speed rotation whereby pistons of the slower piston assembly comprise trailing pistons during the power and intake phases and pistons of the faster piston assembly comprise leading pistons during the compression and exhaust phases of the engine's operating cycle.

BACKGROUND OF THE INVENTION

The cat-and-mouse type rotary engine includes generally identical two piston assemblies each having a plurality of diagonally opposed pistons that divide a toroidal working chamber into a plurality of subchambers, wherein the piston assemblies are connected to the driveshaft (or output shaft) by a connecting means. The working chamber assembly has crevices that extend circumferentially between the working chamber assembly's housing and piston assemblies and between piston assemblies.

The cat-and-mouse type rotary engine is expected to have two key technical advantages for attaining higher efficiency than the conventional reciprocating engine such that (1) the intake and exhaust port designs are simpler and (2) the engine is potentially less susceptible to knocking. This engine is expected to be much lighter than the conventional reciprocating engine also. But, there is no record of successful development of the cat-and-mouse type rotary engine. This is because, we believe, the engine possibly has or at least is perceived to have problems in the sealing means of the working chamber and in the connecting means of the piston assemblies to the output shaft.

Seal means to seal the crevices in the working chamber assembly proposed in the past include the so called chamber ring or packing ring first proposed by Weed in U.S. Pat. No. 1,328,410, and later improved by various inventors. Connecting means proposed in the past include the use of a sun-planetary gear and crank mechanism by Kauertz (U.S. Pat. No. 3,144,007) and a modified sun-planetary gear and crank mechanism by Bakhtine (U.S. Pat. No. 6,305,345).

The chamber ring (or packing ring) has never been tested as far as the present inventor knows. The connecting means invented by Bakhtine, though it is an improvement over that invented by Kauertz, is expected to cause unnecessarily large amount of frictional loss by the sun-planetary gear sets especially during high speed operation. This is because Bakhtine's connecting means comprises two separate parts wherein each of which parts is disposed in each side of the working chamber assembly housing and thus the planetary gears of the two sides are not connected before they mesh with the sun gears, and thus the planetary gear in each side has to take the maximum rotational force of each piston assembly independently of the other planetary gear.

We designed a new cat-and-mouse type rotary engine that does not require the use of the chamber ring (or a packing ring) to seal the working chamber, and that does not generate an excessive amount of frictional loss in the connecting means. The new engine is equipped with a means to attain a variable compression ratio and/or a means to vary the number of operating cylinders (or working subchambers).

OBJECTS OF THE INVENTION

An object of the present invention is the provision of a rotary engine that has a plurality of working chambers equipped with seal means of a proven technology.

An object of the present invention is the provision of a rotary engine with a connecting means that is able to sustain the rotational force of the piston assemblies without causing a large amount of frictional loss.

An object of the present invention is the provision of a rotary engine that is equipped with a cooling means that enables circulation of a large amount of lubrication oil through the piston assembly cavities for cooling the piston assembly.

An object of the present invention is the provision of a rotary engine that is equipped with intake and exhaust ports that assure air tight connection of the intake and exhaust manifolds and the working chambers.

An object of the present invention is the provision of a rotary engine that is equipped with a means to attain a variable compression ratio.

An object of the present invention is the provision of a rotary engine that is equipped with a variable cylinder mechanism.

SUMMARY OF THE INVENTION

The rotary piston engine of the preferred embodiment includes a working chamber assembly that includes a plurality of working chambers enclosed in a stationary working chamber assembly housing with two sidewalls and a connecting means enclosed in a stationary connecting means housing, wherein these housings are connected together to form one engine unit. The working chambers are formed by a pair of piston assemblies that are rotatable about a common axis and rotate in the same direction. The piston assembly includes at least one pair of diametrically opposed pistons attached to a piston hub, which in turn is affixed to either the outer or inner coaxial shaft.

The piston comprises a piston head and a piston vessel. The piston head has a piston surface with a center that forms a circular trajectory around the rotational axis of the coaxial piston shafts as the piston rotates. The internal space of the piston vessel has a circular lateral cross section with a slightly larger diameter than that of the lateral cross section of the piston head. The piston head has a convex outer surface having at least one piston groove within each of which a piston ring is disposed. The piston vessel of the leading piston slidably receives the piston head of the trailing piston, and the piston vessel and the piston head together form a working chamber. Each piston assembly alternately rotates with faster and slower speeds in such a manner that the trailing pistons rotate at a slower speed than the leading pistons during the power and intake phases of engine operation, and the trailing pistons rotate at a faster speed than the leading pistons during the compression and exhaust phases of engine operation.

The working chamber assembly housing includes at least one exhaust port, and at least one intake port in each sidewall, and a hole made on the outer wall that align with a hole that is made on the outer wall of each of the piston heads, through which holes each of the spark plugs is made accessible. The piston has an intake port and an exhaust port of generally the same design. The intake port (and the exhaust port) of the piston is equipped with a frustoconical port valve that pivotally opens and closes the port. The piston's intake port (or exhaust port) communicates with the intake (or exhaust) port of the working chamber assembly housing through an opening of an intake port ring during the intake (or exhaust) phase. The intake (or exhaust) port ring has as many openings as the number of pistons in the piston assembly, is affixed to the side of the piston assembly, and rotates around the rotational axis of the piston assembly while the piston travels.

The connecting means includes main transmission means, a pair of auxiliary transmission means, and a pair of internal gears affixed to the internal wall of the connecting means housing. The main transmission means comprises a main transmission gear set and generally identical two parts, one in each side of the main transmission gear set. Each part of the main transmission means comprises a plurality of planetary gear and crank mechanisms, each of which comprises a planetary gear, a connecting rod, a piston pin, and a crank pin. The planetary gears of the two parts share the same gear shaft that is rotatably mounted on the main gear. One auxiliary transmission means is affixed to the outer piston shaft, and the other auxiliary transmission means is affixed to the inner piston shaft.

The working chamber assembly and the connecting means are cooled and lubricated by cooling and lubrication means. The oil delivery system includes oil bores, an oil outlet, oil gutters, an oil pump, and an oil pan. The cooling and lubrication oil is pumped into the working chamber assembly through an oil bore, which extends along the rotational axis of the inner piston shaft. The cooling and lubrication oil carried by the bore is diverted into radially extending bores, and into the inner cavities of the piston assemblies. The oil used to cool the piston assemblies shoots out of these piston assemblies from the oil outlet to the main oil gutter that extends along the outer most periphery of the internal wall of the working chamber assembly housing, and recycled back to the oil pan and oil pump.

BRIEF DESCRIPTION OF THE DRAWINGS

The above and other objects and advantages of the invention will be better understood from the following description when considered with the accompanying drawings. It here will be understood that the drawings are for purposes of illustration only and not by way of limitation of the invention. In the drawings, like reference characters refer to the same parts in the several views.

DETAILED DESCRIPTION OF THE INVENTION

Figure 1:
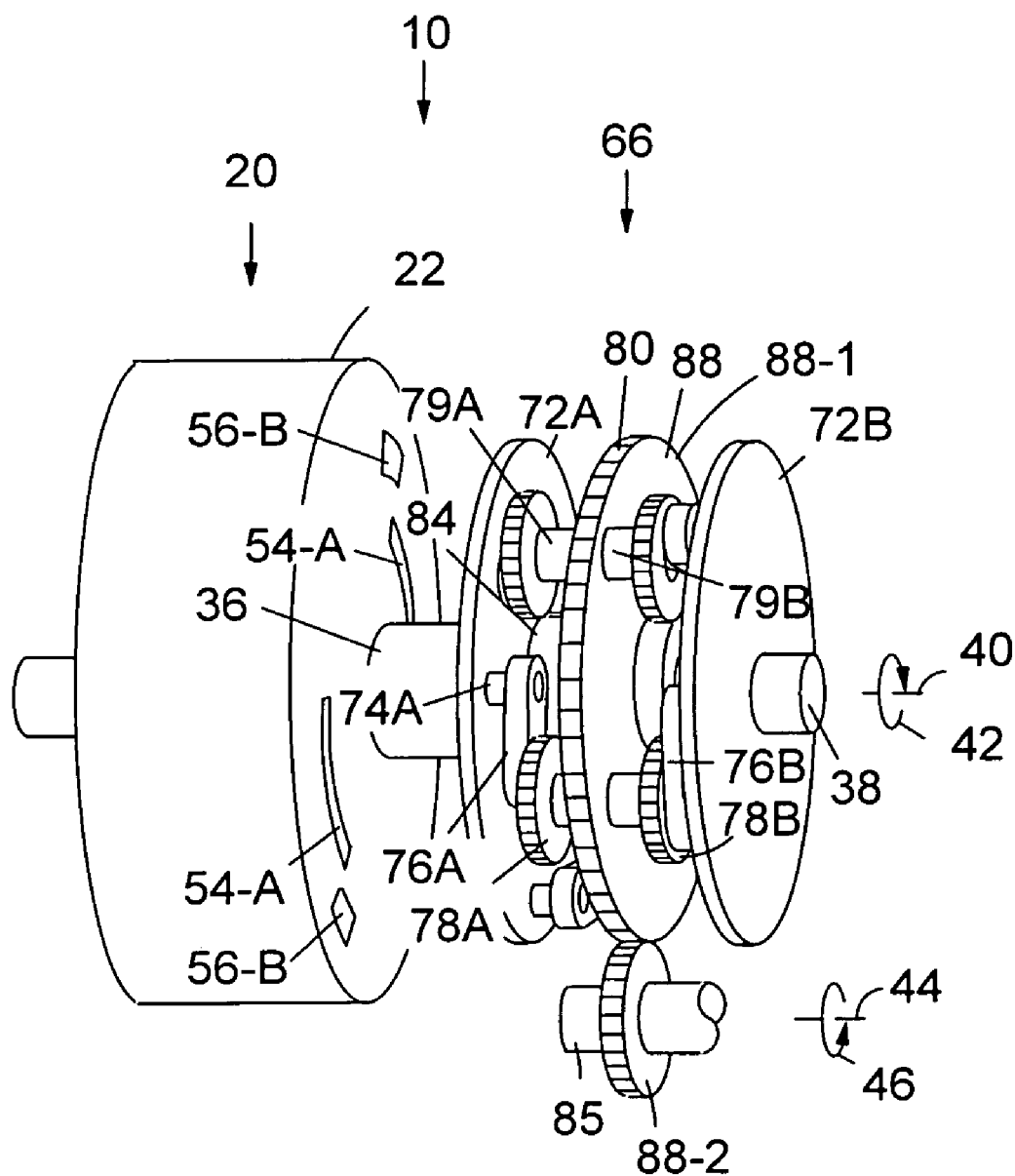
FIG. 1 is a perspective view of the working chamber assembly housing and the connecting means of the rotary piston engine of the preferred embodiment of the present invention.
Figure 2:
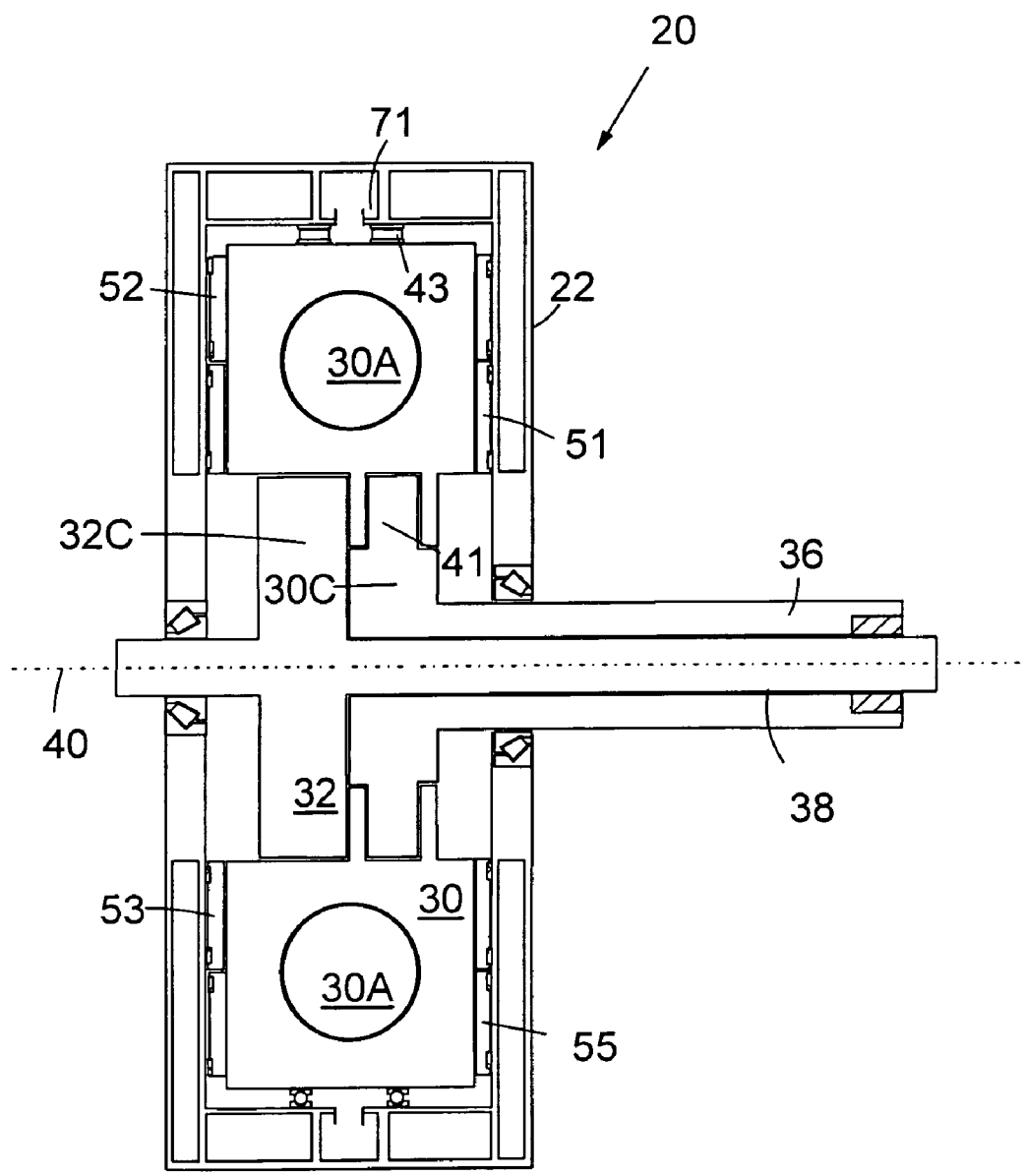
FIG. 2 is a cross sectional view of the working chamber assembly of the rotary piston engine of the preferred embodiment of the present invention.
Figure 3:
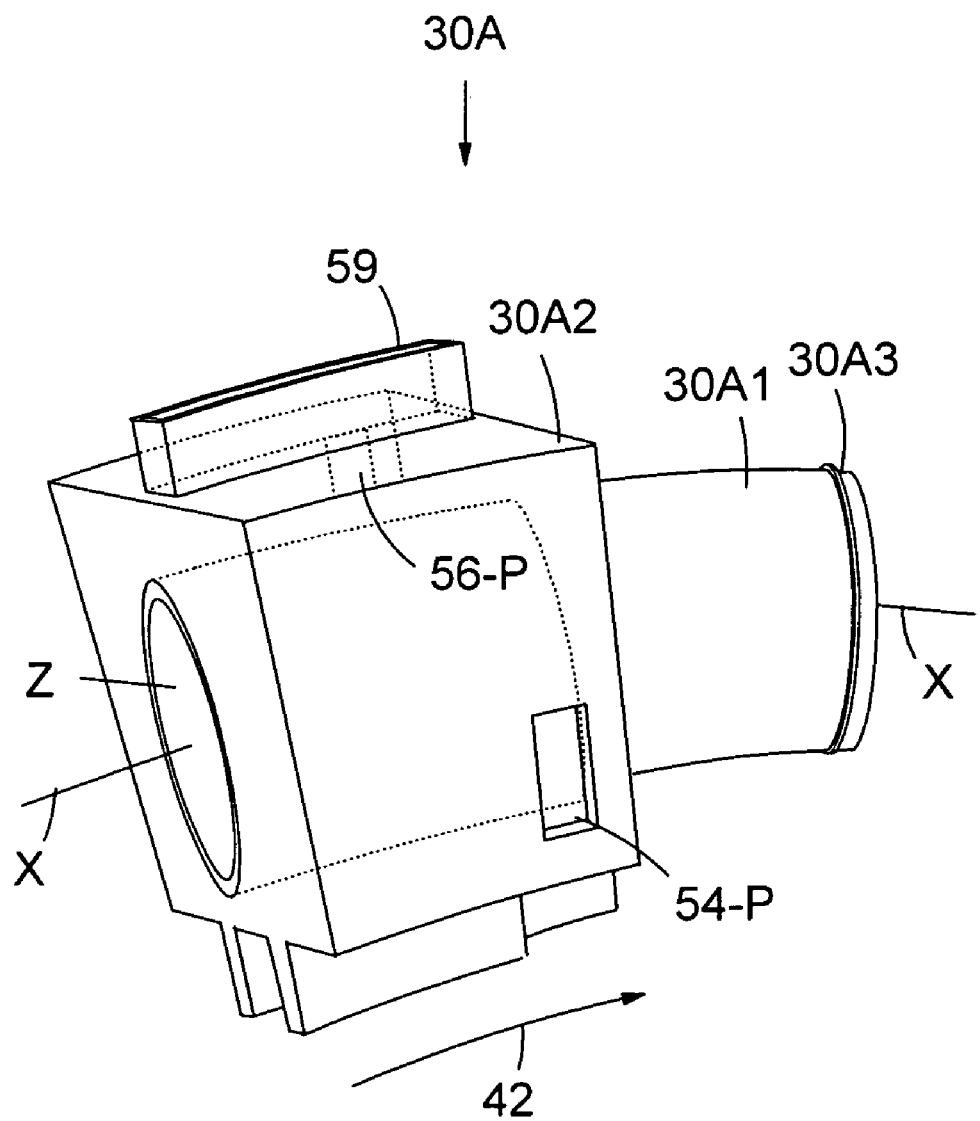
FIG. 3 is a perspective view of the piston.
Figure 4:
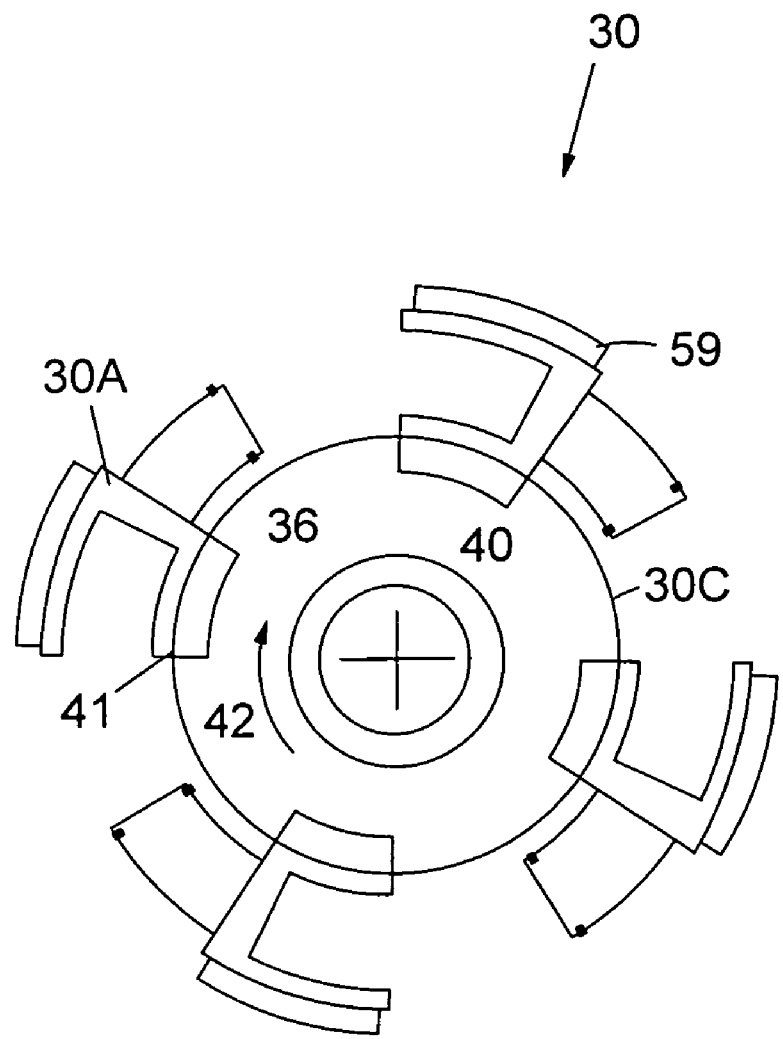
FIG. 4 is a cross sectional view of the piston assembly of an 8-piston rotary engine.
Figure 5:
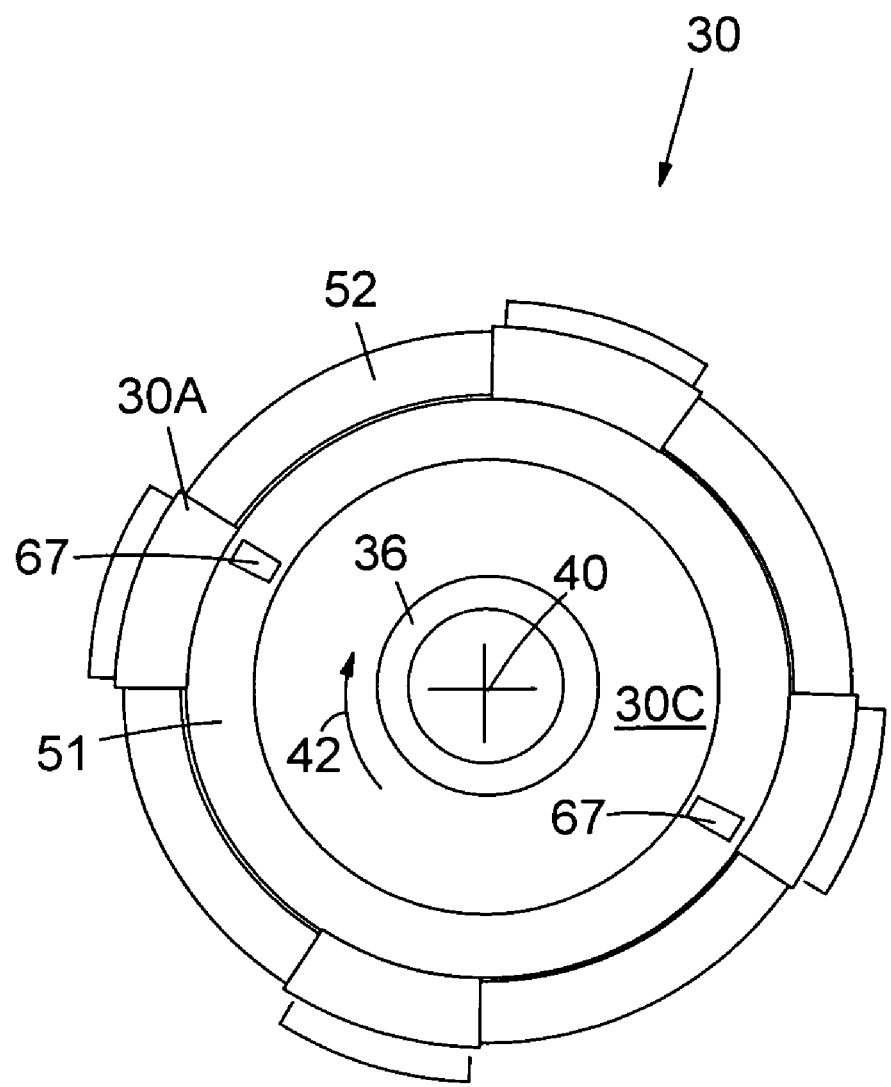
FIG. 5 is a side elevational view of the piston assembly of an 8-piston rotary engine.
Figure 6:
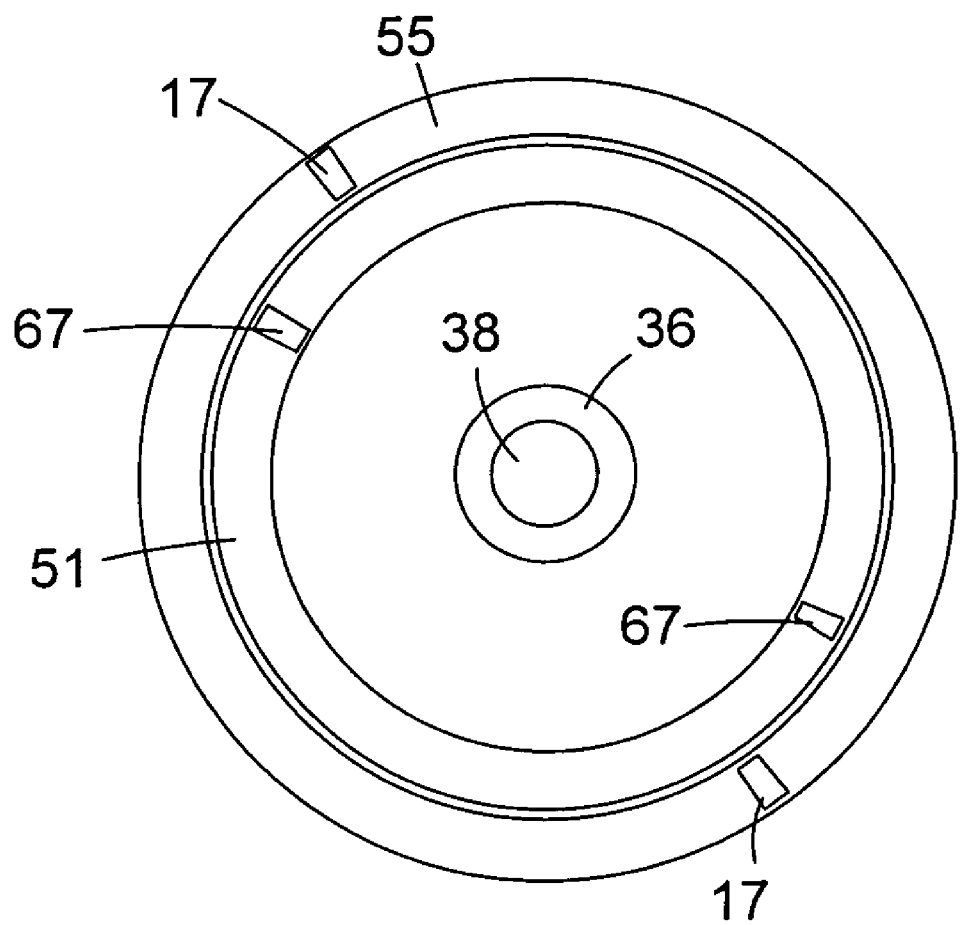
FIG. 6 is a cross sectional view of the intake port ring of a piston assembly and the exhaust port ring of the other piston assembly on the same side of the working chamber assembly.
Figure 7:
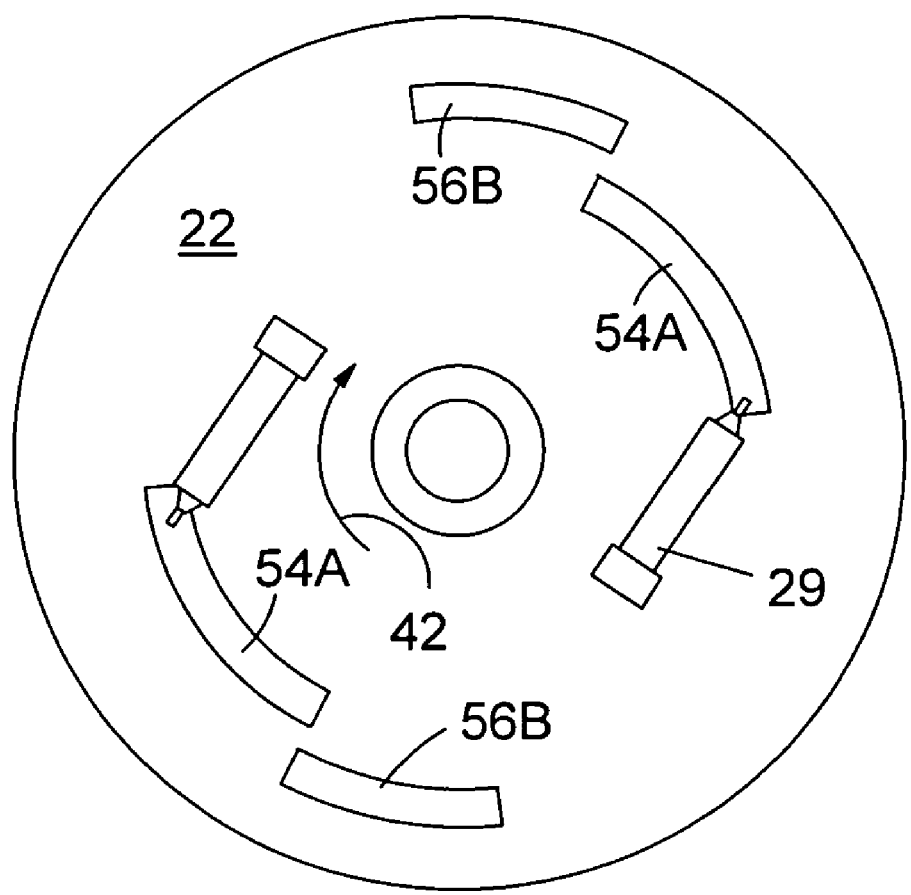
FIG. 7 is a side view of the sidewall of the working chamber assembly housing.

Reference now is made to FIGS. 2 through 8 of the drawings wherein the preferred embodiment of an engine 10 is shown to include a working chamber assembly 20 having a pair of piston assemblies 30 and 32 enclosed in a stationary working chamber assembly housing 22 having two sidewalls, and a connecting means 66 enclosed in a stationary connecting means housing (not shown), wherein these housings are connected together to form one engine unit.

The piston assembly 30 includes at least one pair of diametrically opposed pistons 30A mounted on a piston hub 30C, and the piston assembly 32 includes at least one pair of diametrically opposed pistons 32A mounted on a piston hub 32C. The piston hub 30C is affixed to a tubular piston shaft 36, and the piston hub 32C is affixed to an inner shaft 38, wherein the outer tubular piston shaft 36 is rotatably mounted on an inner shaft 38. The number of pistons per piston assembly may be a multiple of four. The piston assemblies 30 and 32 are rotatable about a common axis 40 and, in operation, rotate in the same direction as indicated by an arrow 42. Each piston assembly alternately rotates with faster and slower speeds in such a manner that the leading pistons rotate at a faster speed than the trailing pistons during the power and intake phases of the working chamber operation, and the trailing pistons rotate at a faster speed than the leading pistons during the compression and exhaust phases of the working chamber operation.

Figure 8:
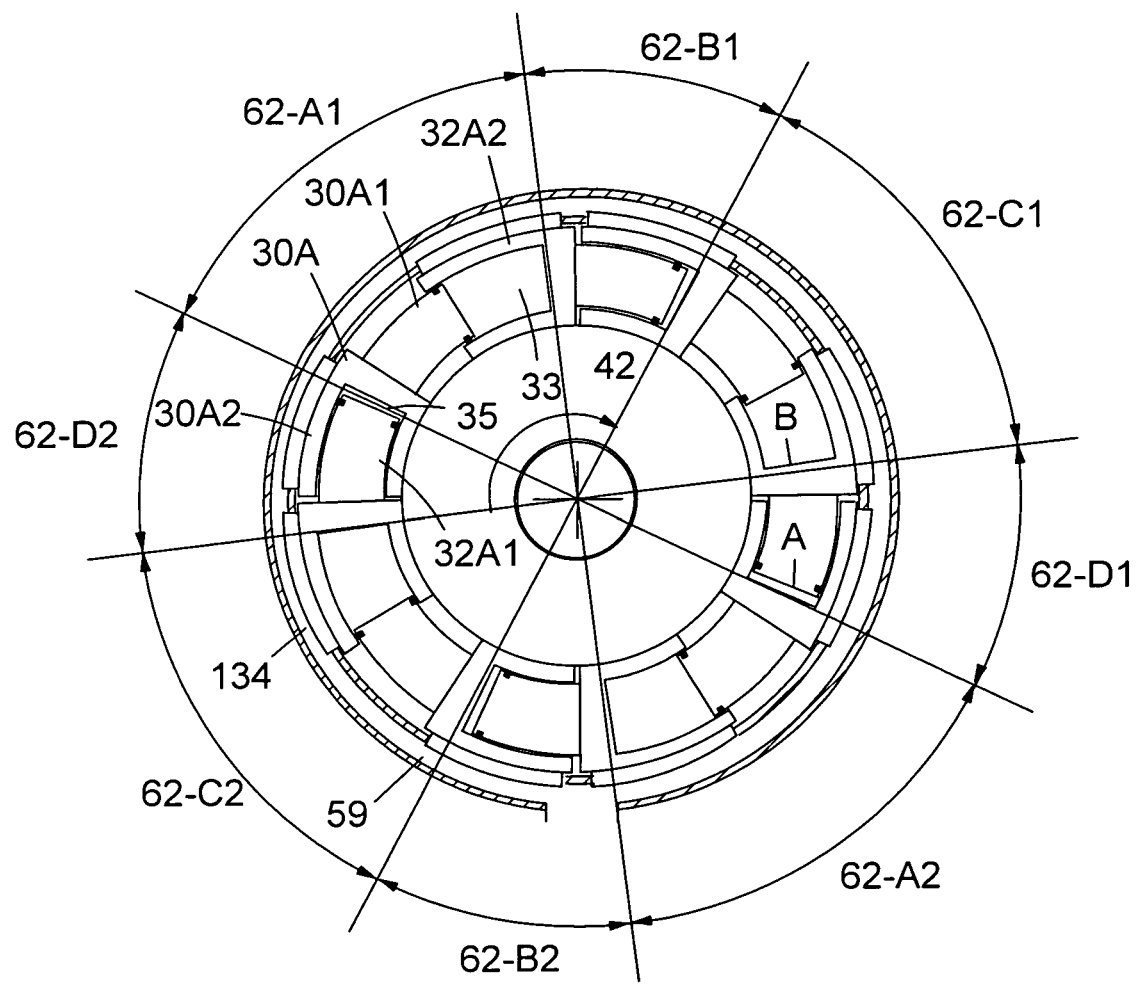
FIG. 8 is a cross sectional view of the working chamber assembly of an 8-piston rotary engine.

Referring to FIGS. 3 through 8 of the drawings, the piston 30A, which is generally identical to the piston 32A, comprises a piston head 30A1 and a piston vessel 30A2. The piston head 30A1 has a piston surface with a center that forms a circular trajectory X-X around the rotational axis 40 of the piston shafts 36 and 38 as the piston 30A rotates. The internal space of the piston vessel 30A2 has a circular lateral cross section Z (relative to the piston's direction of travel) with a slightly larger diameter than that of the circular lateral cross section of the piston head 30A1, and the center of the circular lateral cross section Z of the piston vessel 30A2 shares the circular trajectory X-X with the piston head 32A1 as the piston travels. The piston head 30A1 has a convex outer surface having at least one piston groove within each of which a piston ring 30A3 is disposed. As shown in FIG. 8, the piston vessel 32A2 of the leading piston 32A slidably receives the piston head 30A1 of the trailing piston 30A, and the piston vessel 32A2 and the piston head 30A1 together form a working chamber 33. Similarly, the piston vessel 30A2 of the leading piston 30A slidably receives the piston head 32A1 of the trailing piston 32A, and the piston vessel 30A2 and the piston head 32A1 together form a working chamber 35. The piston ring 30A3 and the piston ring 32A3 seal the working chamber 33 and the working chamber 35, respectively. The piston 30A1 is snapped into a socket 41 of the piston hub 30C. In operation, the piston 30A1 is held in place by the socket 41 and roller bearings 43 that roll along the internal wall of the working chamber assembly housing 22. A spark plug 39 (see FIG. 10) is affixed to the piston surface end of the piston head 30A1 (and 32A1).

The working chamber assembly housing 22 has at least one intake port 54-A and at least one exhaust port 56-A on each sidewall of the working chamber assembly housing 22 and at least one intake port 54-B (not shown) and at least one exhaust port 56-A (not shown) on the other sidewall. The piston 30A has an intake port 54-P and an exhaust port 56-P. The working chamber assembly housing 22 has a hole made on the outer wall and aligned with a hole that is made on the outer wall of each of the piston heads 30A1 (and 32A1) through which holes each of the spark plugs 39 is accessible.

An intake port ring 51 having the same number of openings 67 as the number of pistons in the piston assembly 30 is affixed to the side of the pistons 30A in the space between the pistons 30A and a sidewall of the working chamber assembly housing 22 in such a manner that the opening 67 will be disposed next to the piston 30A's intake port 54-P. An exhaust port ring 52 having the same number of openings 14 as the number of pistons in the piston assembly 30 is affixed to the pistons 30A in the space between the pistons 30A and the other sidewall of the working chamber assembly housing 22 in such a manner that the opening 14 will be disposed next to the piston 30A's exhaust port 56-P. Similarly, an intake port ring 53 having the same number of openings 67 as the number of pistons in the piston assembly 32 is affixed to the pistons 32A in the space between the pistons 32A and a sidewall of the working chamber housing 22 in such a manner that the opening 67 will be disposed next to the piston 32A's intake port 54-P, and an exhaust port ring 55 having the same number of openings 14 as the number of pistons in the piston assembly 32 is affixed to the pistons 32A in the space between the pistons 32A and the other sidewall of the working chamber housing 22 in such a manner that the opening 14 will be disposed next to the piston 32A's exhaust port 56-P. The piston's intake port 54-P of the piston 30A is aligned with the intake port 54-A and the piston's exhaust port 56-P of the piston 30A is aligned with the exhaust port 56-A (not shown). Similarly, the piston's intake port of the piston 32A is aligned with the intake port 54-B (not shown), and the piston's exhaust port of the piston 32A is aligned with the exhaust port 56-B.

The intake port 54-A of the working chamber assembly housing communicates with the inner cavity, which is the working chamber, of the piston vessel 30A2 while the opening 67 to the piston 30A travels next to the intake port 54-A of the working chamber assembly housing. Similarly, the exhaust port 56-A of the working chamber assembly housing communicates with the inner cavity of the piston vessel 30A2 while the opening 14 to the piston 30A travels next to the exhaust port 56-A of the working chamber assembly housing.

In an eight-piston engine as illustrated in FIG. 8 of the drawings, the working chamber assembly housing 22 contains eight working chambers. The combustion phase of engine operation occurs during the leading piston's intake port and the exhaust port, both at the closed state, are generally within the segments shown by double arrows 62-A1 and 62-A2. The exhaust phase of the engine occurs during the leading piston's exhaust port at the open state is generally within the segments shown by double arrows 62-B1 and 62-B2. The intake phase occurs during the leading piston's intake port at the open state is generally within the segments shown by double arrows 62-C1 and 62-C2. And, the compression phase occurs during the leading piston's intake port and exhaust port, both at the closed state, are generally within the segments shown by double arrows 62-D1 and 62-D2. If the leading piston's intake port and exhaust port are within the segments 62-A1, 62-A2, 62-C1 or 62-C2, the leading piston assembly is said to be in the active phase, and if the leading piston's intake port and exhaust port are within the segments 62-B1, 62-B2, 62-D1 or 64-D2, the leading piston assembly is said to be in the non-active phase. FIG. 8 shows the time point at which the piston assembly 30 that includes pistons 30A has just finished the non-active phase and is just about to start the active phase, and piston assembly 32 that includes pistons 32A has just finished the active phase and is just about to start the non-active phase. FIG. 8 indicates that in an eight-piston engine, always, a pair of the operating phases is going on in the working chamber assembly, and each working chamber experiences two full operating cycles of the four successive engine phases during one full rotation of the driveshaft (or output shaft).

Figure 9:
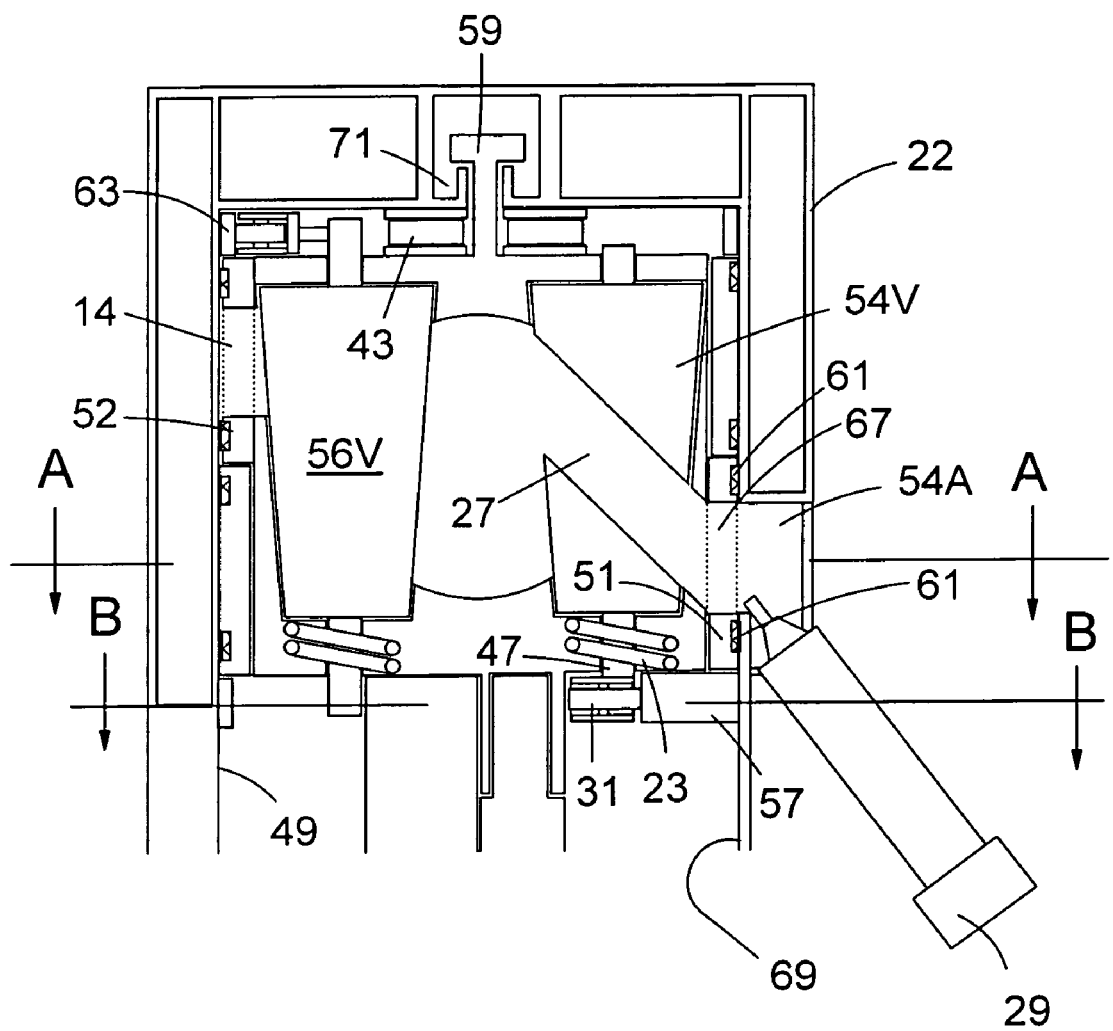
FIG. 9 is a cross sectional view in partial elevational view of the working chamber including the intake port.
Figure 10:
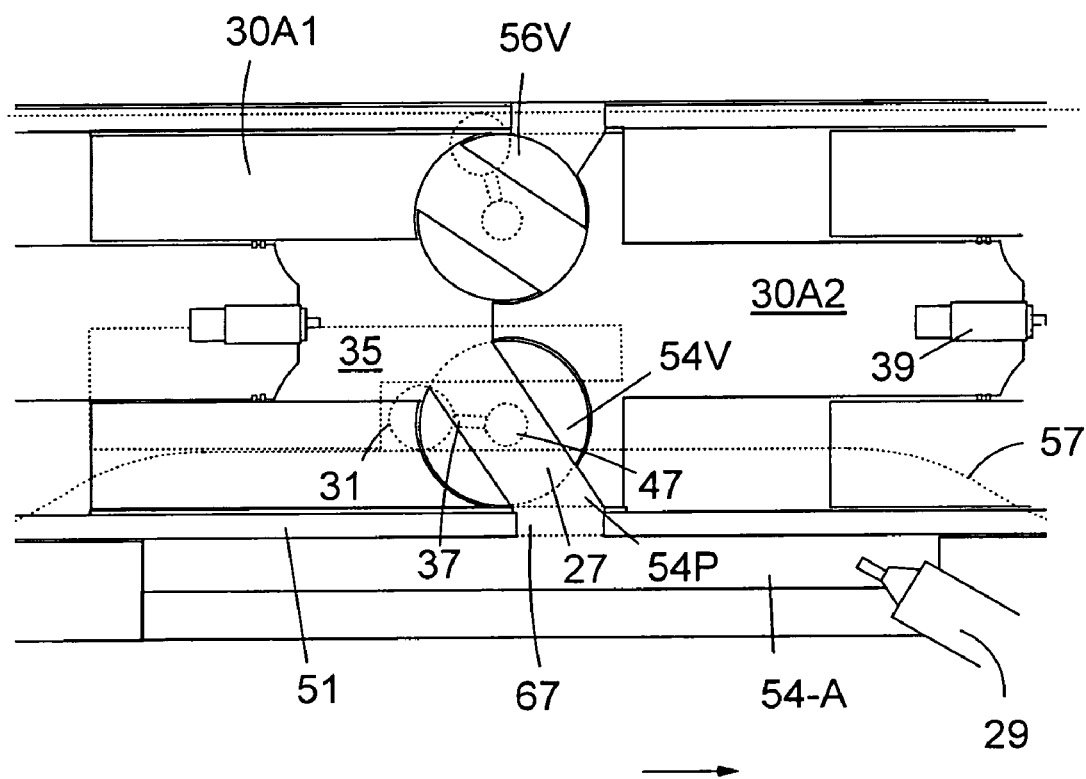
FIG. 10 is a cross sectional view of the working chamber taken along A-A of FIG. 9.
Figure 11:
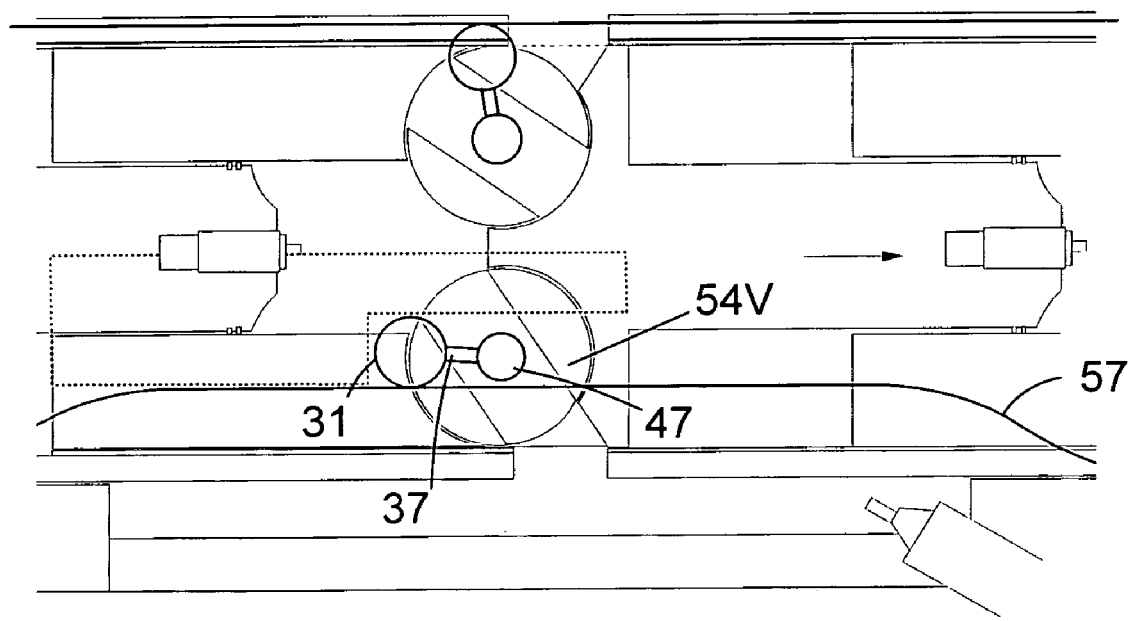
FIG. 11 is a cross sectional view of the working chamber taken along B-B of FIG. 9.

Reference is now made to FIGS. 9 through 11 of the drawings wherein diagrams illustrating the intake port 54-A and the piston 30A are shown. The piston vessel 30A1 of the piston 30A includes a piston's intake port 54-P, a frustoconical pivotal intake port valve 54-V that lets the flow of the air/fuel mixture into the working chamber 35, and a frustoconical pivotal exhaust port valve 56-V that lets the flow of the exhaust air out from the working chamber 35. The intake port valve 54-V has an inner passage 27 through which the fuel mixture flows into the working chamber 35 while the intake port valve 54-V is at the open state as shown in FIGS.

9 through 11. The frustoconical pivotal intake port valve 54-V has a part cylindrical hole that receives a coaxial (to the intake port valve 54-V) shaft at the lower part and the upper part. The lower coaxial shaft 47 is fitted with an arm 37 with a roller 31 that rolls against a ring-shaped intake port cam 57. The ring-shaped intake port cam 57 forms a circle around the piston shafts, wherein the ring-shaped cam 57 is affixed to the internal wall 69 of the working chamber assembly housing 22. The intake port cam 57 has "high" segments, "low" segments, and transition segments. In the "high" segment, the intake port valve 54-V is kept open, and in the "low" segment in which the intake port valve 54-V is kept closed. A spring 23 keeps the intake port valve 54-V in the closed state while the intake valve roller 31 rolls along the "low" segment of the ring-shaped intake port cam 57.

The fuel is injected into the intake port 54-A by a fuel injector 29. The intake port 54-A faces the intake port ring 51, which is affixed to the piston vessels 30A1, and rotates around the rotational axis 40. The space between the intake port ring 51 and the inner wall of the working chamber assembly housing 22 is sealed off from the rest of the working chamber assembly by the intake port ring seal means 61 so that no air and fuel mixture left in the intake port 54-A will leak out at to the inner space of the working chamber housing 22 any time.

The exhaust port 56-A of the piston assembly 30 is located on the opposite side (left side in FIG. 9, but not shown) of the working chamber assembly 20 from the intake port 54-A. The frustoconical pivotal exhaust port valve 56-V has a part cylindrical hole that receives a coaxial (to the exhaust port valve 56-V) shaft at the lower part and the upper part. The upper coaxial shaft is fitted with an arm with a roller that rolls against a ring-shaped exhaust port cam 63. The ring-shaped exhaust port cam 63 forms a circle around the piston shafts, wherein the ring-shaped cam 63 is affixed to the internal wall 49 of the working chamber assembly housing 22. The exhaust port cam 63 has "high" segments, "low" segments, and transition segments. In the "high" segment, the exhaust port valve is kept open, and in the "low" segment in which the exhaust port valve is kept closed. A spring keeps the exhaust valve 56-V in the closed state while the exhaust valve roller rolls along the "low" segment of the ring-shaped exhaust port cam. As described above, conceptually, the intake port 54-A and the exhaust port 56-A are generally the same, and thus exchangeable.

The intake port system includes the intake port 54-A, the piston's intake port 54-P, the intake port valve 54-V and the intake port ring 51. The intake system of the piston assembly 32 is generally identical to the intake system of the piston assembly 30. The exhaust system of the piston assembly 30 includes the exhaust port 56-A, the piston's exhaust port 56-P, the exhaust port valve 56-V, and the exhaust port ring 52. The exhaust port system of the piston assembly 32 is generally identical to the exhaust system of the piston assembly 30.

Figure 12:
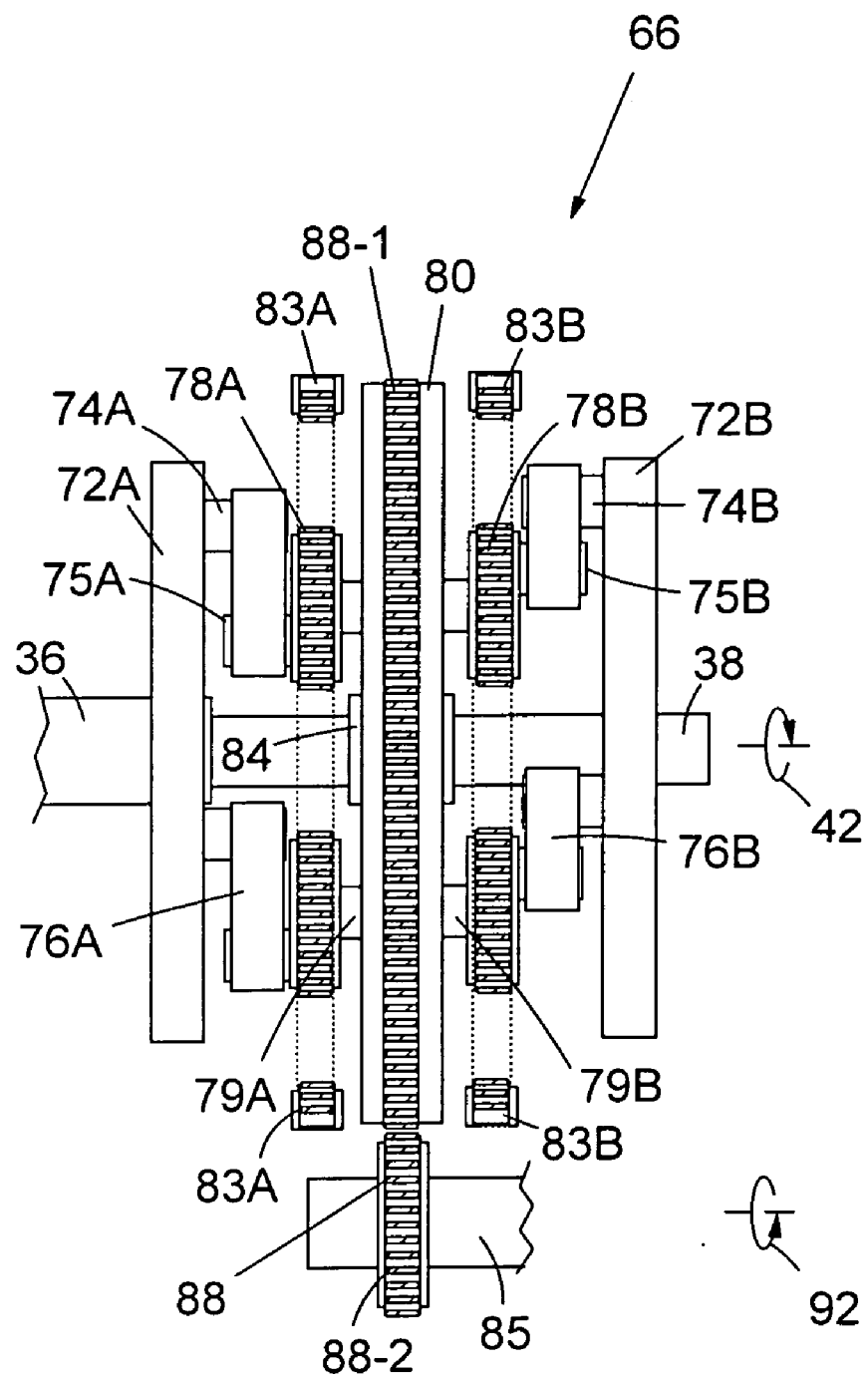
FIG. 12 is a side elevational view of the connecting means showing only two front planetary gear and crank mechanisms in each part.

Reference is now made to FIG. 1 and FIG. 12, wherein the connecting means 66 interconnecting the first and second piston assemblies 30 and 32 to an engine output shaft 85 and providing the piston assemblies with variable speed rotation in same direction during recurrent periods of rotation is shown. The connecting means 66 includes a main transmission means 80, a pair of auxiliary transmission means 72A and 72B, and a pair of not-rotatable internal gears 83A and 83B that are affixed to the internal wall of the connecting means housing. The main transmission means 80 comprises a main transmission gear set 88 and generally identical two transmission parts A and B. Suffix A is used to identify connecting means elements in the transmission part A, and suffix B is used to identify connecting means elements in the transmission part B. The main transmission gear set 88 comprises the main transmission gear 88-1, which is mounted on a coaxial shaft 84 that is rotatably mounted on the inner piston shaft 38 and the output gear 88-2 that is mounted on the output shaft 85.

The transmission part A of the main transmission means 80 comprises a plurality of planetary gears 78A and the same number of means for transmitting variable speed rotation, wherein each of which means is a crank mechanism that comprises a connecting rod 76A, a piston pin 74A, and a crank pin 75A. The planetary gear 78A is rigidly mounted on a gear shaft 79A, which in turn is rotatably mounted on the hub of a main transmission gear 88-1, and meshes with the internal gear 83A. The planetary gear 78A is rigidly mounted on a gear shaft 79A, which in turn is rotatably mounted on the hub of a main transmission gear 88-1. One end of the connecting rod 76A is pivotally mounted on the piston pin 74A that is pivotally mounted on the auxiliary transmission means 72A, and the other end of the connecting rod 76A is rotatably mounted on the crank pin 75A that is rotatably mounted on the gear 78A on the opposite side from the hub of the main transmission gear 88-1 in such a manner that the axis of the crank pin 75A will be apart from the axis of the gear shaft 79A by a predefined amount. The distance between the axis of the crank pin 75A and the axis of the gear shaft 79A is the crank arm length. The auxiliary transmission means 72A is affixed to the outer piston shaft 36. The number of planetary gears 78A is the same as the number of pistons in the preferred embodiment, though it does not have to be so. The main transmission gear 88-2 rotates in the direction shown by the arrow 42 and the planetary gear 98A rotates in the direction shown by an arrow 92.

In the eight-piston engine, the radius of the planetary gear 78A is one fourth of the radius of the internal gear 83A, and the radius of the output gear 88-2 is one fourth of the radius of the main transmission gear 88-1. Thus, in the eight-piston engine, which is the preferred embodiment of the present invention, for one full revolution of the piston assembly 30 (or 32), the main transmission gear 88-1 rotates one full revolution, and the output gear 88-2 rotates four full revolutions. In the four-piston engine, the radius of the planetary gear 78A is one half of the radius of the internal gear 83A, and the radius of the output gear 88-2 is one half of the radius of the main transmission gear 88-1. Thus, in the four-piston engine, for one full revolution of the piston assembly 30 (or 32), the main transmission gear 88-1 rotates one full revolution, and the output gear 88-2 rotates two full revolutions.

The auxiliary transmission means 72B is affixed to the inner piston shaft 38, and the gear shaft 79A of the planetary gear 78A and the gear shaft 79B of the planetary gear 78B of the transmission part B are extension of each other. The transmission part B is generally identical to the transmission part A, and thus its detailed description should not be necessary.

The eight-piston engine has an advantage such that it is expected to have less frictional loss and less intake/exhaust port loss at higher rotational speeds than the four-piston engine will. The less frictional loss in the connecting means is expected mainly because the piston assemblies of the eight-piston engine rotate at a speed equaling one half that of the four-piston engine that will result in less inertia of the piston assemblies, and the less intake/exhaust port loss is expected because the eight-piston engine enables to halve the capacity of the piston vessel and thus one half the amount of air/fuel mixture and exhaust air pass through the intake/exhaust ports. In addition, the eight-piston engine with the smaller vessel capacity may be able to use a higher compression ratio than the four-piston engine with twice the size in the vessel capacity can.

Figure 13:
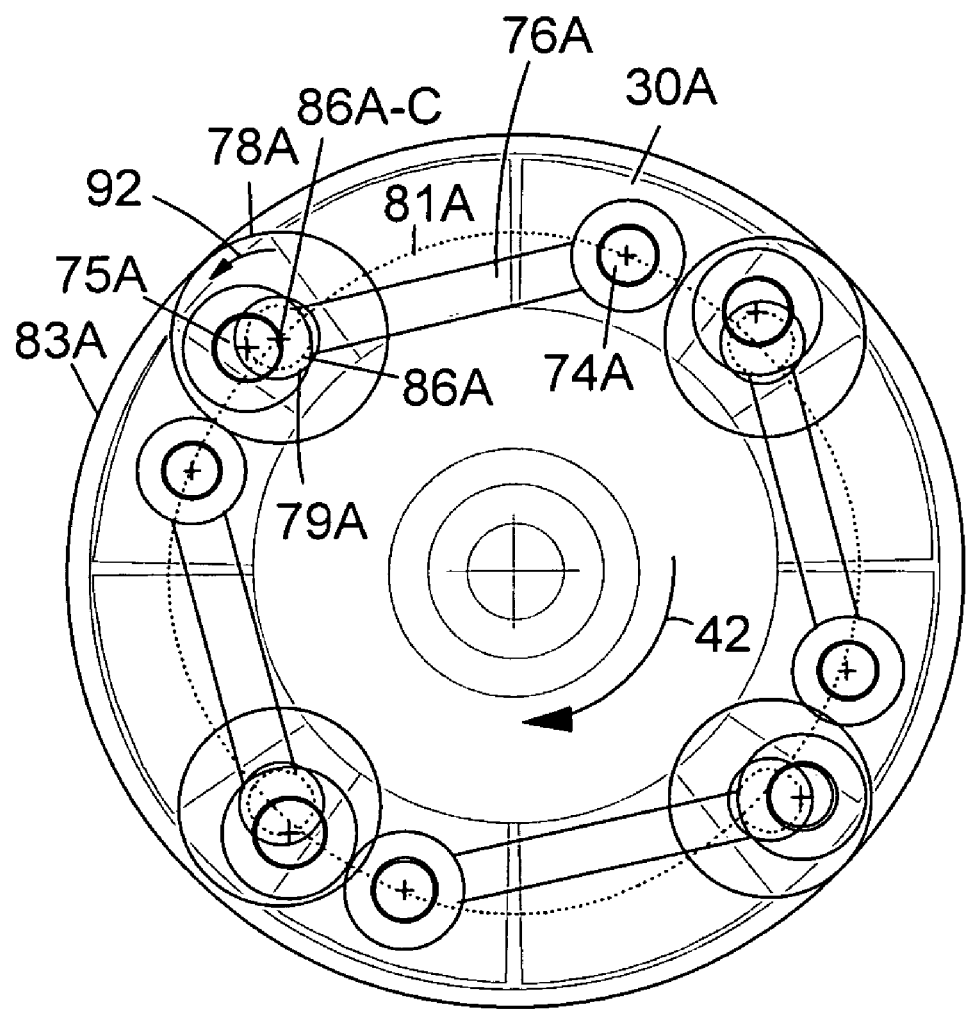
FIG. 13 is a side elevational view the internal gear-planetary gear and crank mechanism on the A part of the main transmission means.

FIG. 13 shows the state of the planetary gear and the crank mechanism in the transmission part A of the eight-piston engine at the time point each working chamber of the engine has just completed an engine phase and just about to start a new engine phase. For the illustration purpose, the pistons are shown in a simplified form, wherein the leading piston surface in the simplified piston in FIG. 13 represents the piston surface (shown by A in FIG. 8) of the piston, and the trailing piston surface in the simplified piston represents the internal flat surface of the piston vessel (shown by B in FIG. 8).

As shown in FIG. 13, the axis of the gear shaft 79A of the planetary gear 78A rotates around a circle 81A, and the axis of the crank pin 75A rotates around a circle 86A. The center 86A-C of the circle 86A is also the center of the gear shaft 79A that rotates around the circle 81A. The axis of the piston pin 74A, which is shown to be located at the mid-point of the superimposed leading piston for the illustration purpose, is located on the circle 81A of the axis of the gear shaft 79A. The main transmission gear 88-1 rotates in the direction shown by the arrow 42, and the planetary gear 78A that meshes with the internal gear 83A rotates in the opposite direction.

Figure 14:
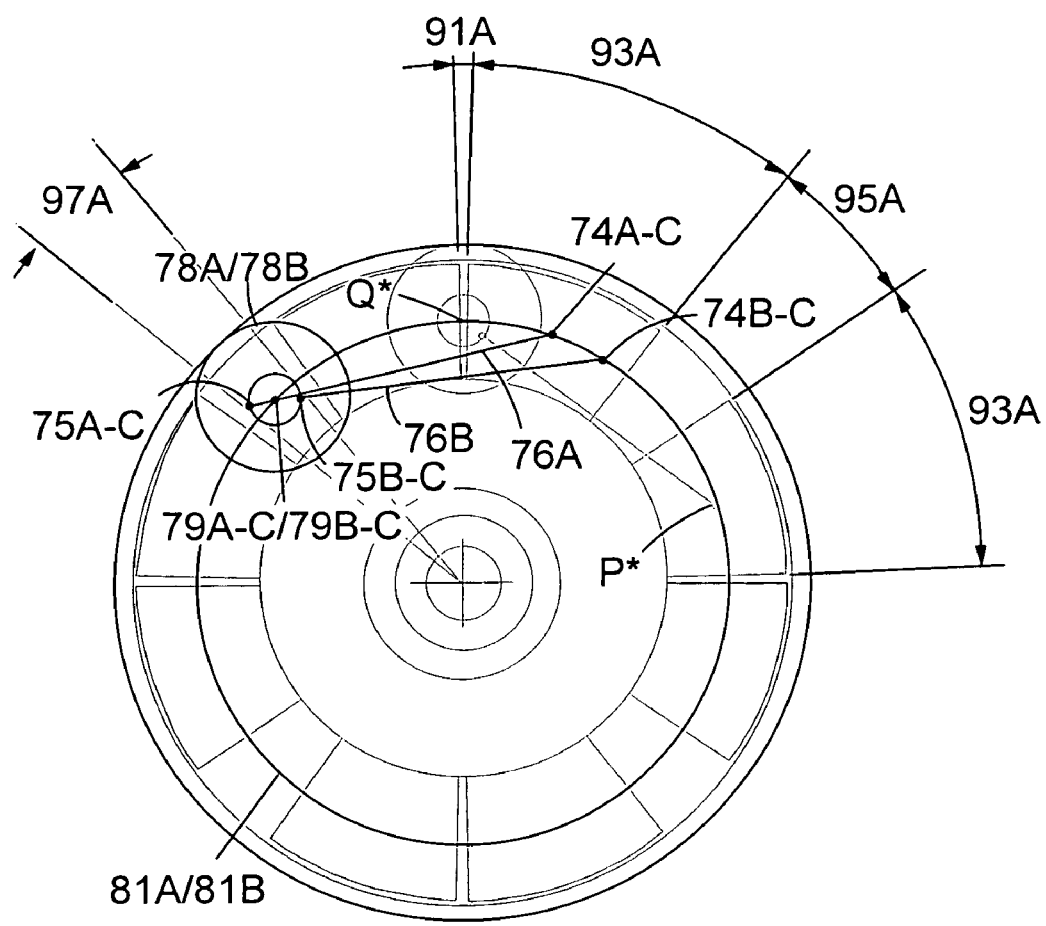
FIG. 14 is a schematic diagram showing superimposed planetary gear and crank mechanisms of the A and B parts.

Reference is now made to FIG. 14, wherein the superimposed simplified schematics of the planetary gear and the crank mechanisms of the transmission parts A and B are shown. The crank mechanism of the piston assembly 30 that include the connecting rod 76A, the crank pin 75A with the axis 75A-C and the piston pin 74A with the axis 74A-C indicates that the piston assembly 30 is at the BDC, and the crank mechanism of the piston assembly 32 that include the connecting rod 76B, the crank pin 75B with the axis 75B-C and the piston pin 74B with the axis 74B-C indicates that the piston assembly 32 piston is at the TDC. Note that if the transmission parts A and B are designed not to share the planetary gear shaft 79A and 79B, the axis 74B-C of the pin 74B* should be at the point shown by P*, and the axis of the planetary gear shaft 79B* should be at the point shown by Q* in FIG. 14.

Figure 15:
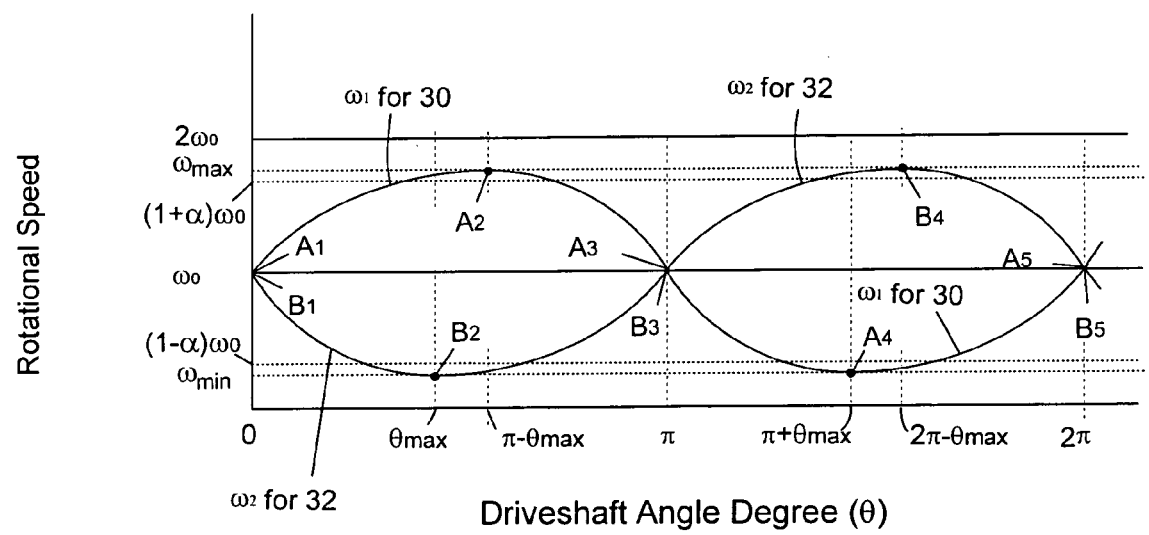
FIG. 15 is a diagram showing rotational speeds of the piston assemblies in the rotary piston engine of the present invention.

Dimensions of key design elements of the piston assembly and the crank mechanism are expressed as the center angles in radians and given as:

$$C_{max}=8(\alpha+\alpha/c)/N_p, \quad (1)$$

$$C_{min}=8(\alpha/c)/N_p, \quad (2)$$

$$P_w=4(\pi/2-\alpha-\alpha/c)/N_p, \text{ and} \quad (3)$$

$$r_c=(C_{max}-C_{min})/4, \quad (4)$$

wherein
$N_p$=number of pistons in the working chamber assembly,
c=compression ratio,
$C_{max}$=maximum working chamber width (rad), shown as 95A in FIG. 15,
$C_{min}$=minimum working chamber width (rad), shown as 91A in FIG. 15,
$P_w$=piston width (rad), shown as 93A in FIG. 15,
$r_c$=crank arm length (rad) shown as 97A in FIG. 15,
$\alpha$=a coefficient (between 0 and 0.5) that shows the minimum and maximum rotational speeds of the piston assemblies 30 and 32 relative to the mean rotational speed $\omega_0$ of the two piston assemblies, wherein the rotational speeds of which piston assemblies follow a sine curve, and their maximum rotational speed is given as $(1+\alpha)\omega_0$ and the minimum rotational speed is given as $(1-\alpha)\omega_0$.

FIG. 14 shows the state of the piston assemblies in which the axis 75A-C of the crank pin 75A of the piston assembly 30 is located at the BDC and the axis 75B-C of the crank pin 75B of the piston assembly 32 is located at the TDC. If we assume that at the state shown in FIG. 14, the driveshaft angle DAD is $\theta$=0, the relative rotational speed $v_{pl}(\theta)$ of the piston assembly 30 to the rotational speed of the piston shaft as a function of $\theta$ may be approximated as (see FIG. 15):

$$v_{pl}(\theta)=1+\alpha[\sin\theta+(\sin 2\theta)/(2\lambda)], \quad (5)$$

and the relative rotational speed $v_{pl}(\theta)$ of the piston assembly 32 to the rotational speed of the piston shaft as a function of $\theta$ may be approximated as:

$$v_{pl}(\theta)=1-\alpha[\sin\theta+(\sin 2\theta)/(2\lambda)], \quad (6)$$

where
$\omega_0$=rotational speed of the driveshaft,
$\theta$=driveshaft angle degree (DAD), and
$\lambda$=connecting rod length/crank arm length.

Figure 16:
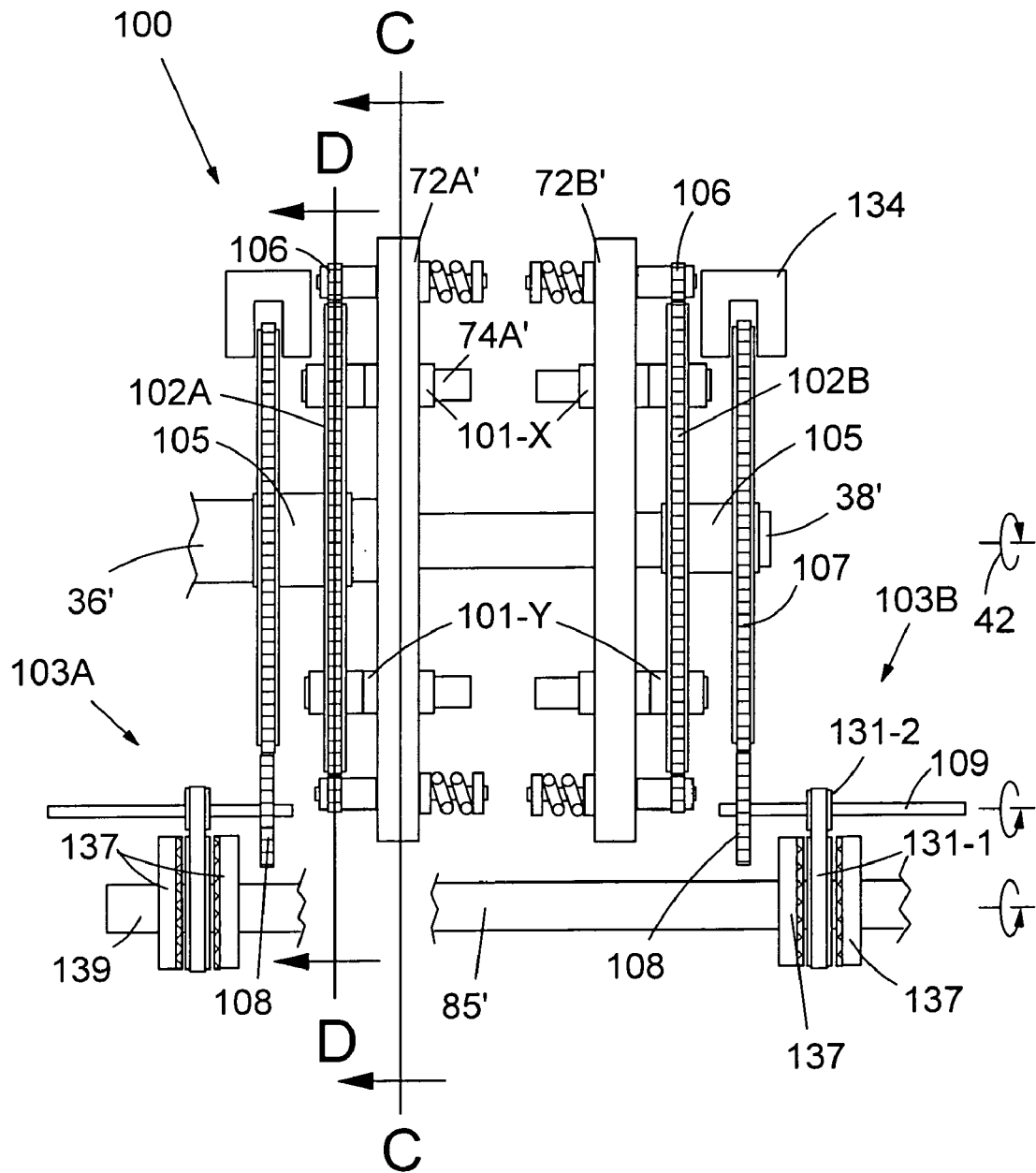
FIG. 16 is a side elevational view in partial cross sectional of the auxiliary transmission means of an alternative embodiment that includes a means to attain a variable compression ratio.
Figure 17:
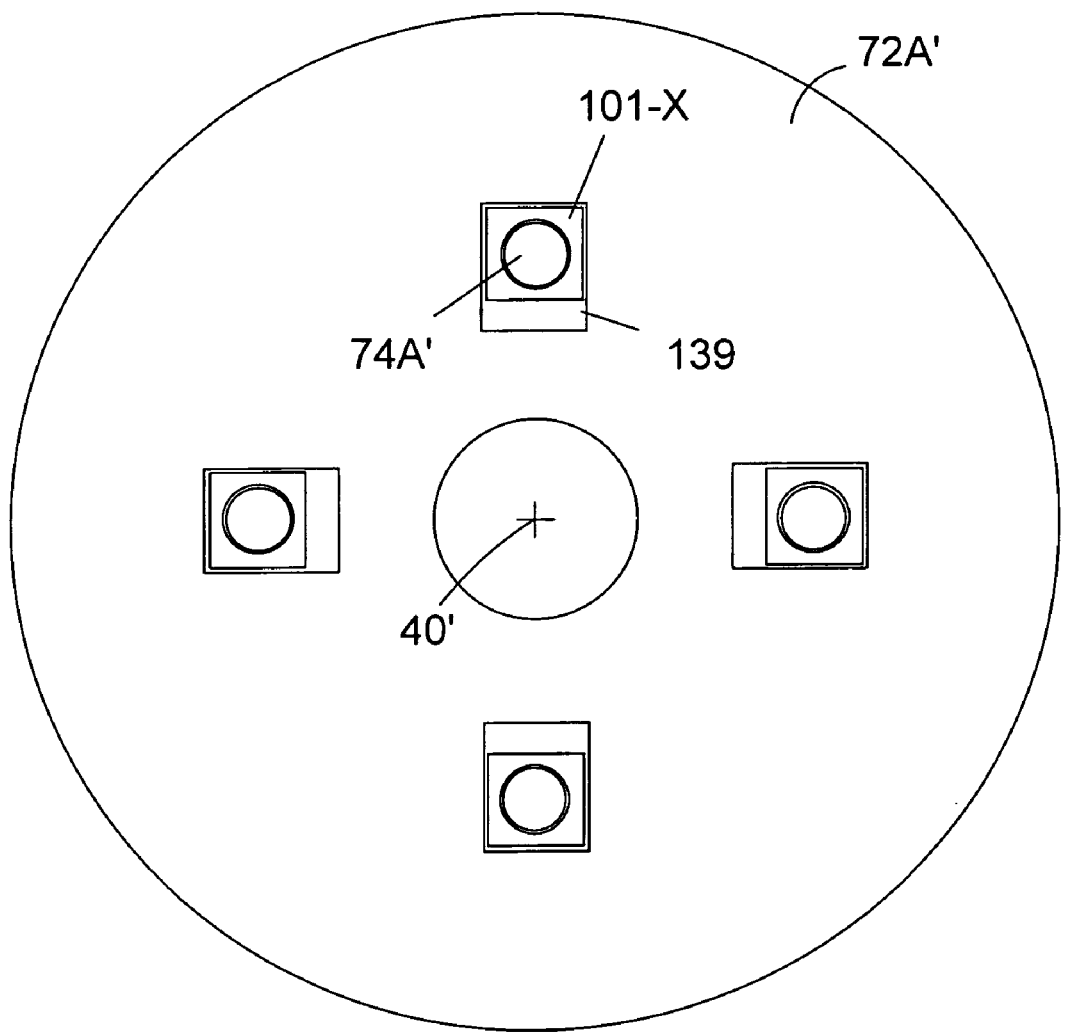
FIG. 17 is a cross sectional view of the auxiliary transmission means of the alternative embodiment taken along C-C of FIG. 16.
Figure 18:
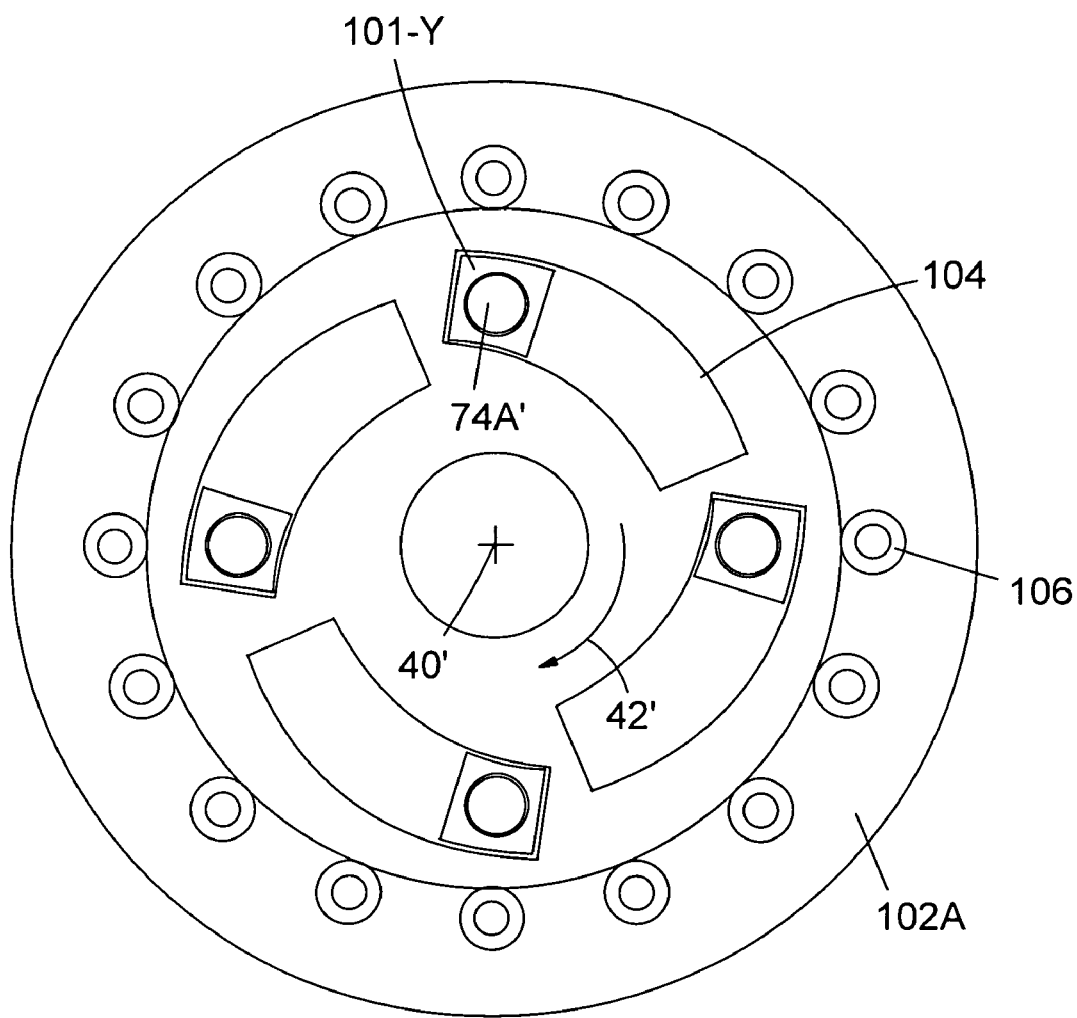
FIG. 18 is a cross sectional view of the auxiliary transmission means of the alternative embodiment taken along D-D of FIG. 16.
Figure 19:
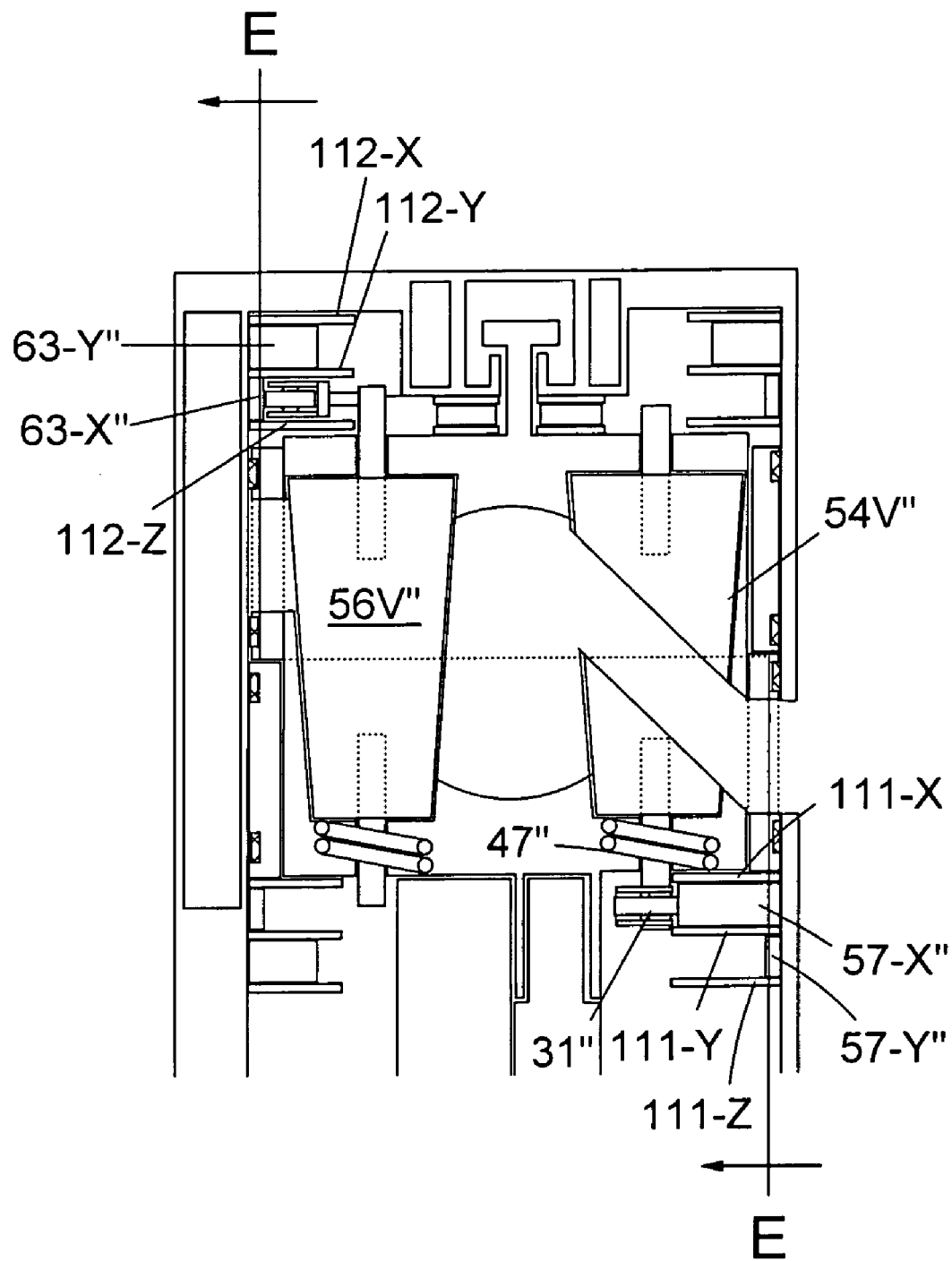
FIG. 19 is a cross sectional view in partial elevational of the working chamber around the intake port in an alternative embodiment that includes a variable cylinder mechanism.

Reference is now made to FIGS. 16 through 18 showing a means to attain a variable compression ratio 100 included in an alternative embodiment of the present invention. The means to attain a variable compression ratio 100 comprising generally identical A part and the B part, and each of which parts includes an auxiliary transmission means 72A' (or 72B') fitted with a plurality of piston pin holding nuts 101, a disc means 102A (or 102B) that moves the piston pin holding nuts 101 outward or inward, and a VCR (variable compression ratio) control means 103A (or 103B).

The piston pin holding nut 101 that pivotally holds the piston pin 74A' (or 74B') comprises a part 101-X that slides radially inward and outward in a square hole 139 with a rectangular cross section in the auxiliary transmission means 72A' (or 72B') and another part 101-Y that slides circumferentially along an elongated opening 104 wherein the part 101-X and the part 101-Y are pivotally connected to each other, and the outer and inner arc edges of the elongated opening 104 share an axis that is not the rotational axis 40' of the piston shafts 36' (or 38').

The disc means 102A is mounted on a tubular shaft 105 that in turn is mounted on the outer piston shaft 36' (or the inner piston shaft 38'). The outer periphery of the disc means 102A has teeth that mesh with the teeth of a plurality of the gears 96 that are spring loaded in such a manner that the spring will generate enough friction to prevent the disc means 102A from rotating by itself.

The VCR control means 103A (or 103B) includes a disc means 107 that is rotatably mounted on the tubular shaft 105 and is fitted with gears on its periphery; a shaft 109 that is parallel to the drive shaft 85', a disc means driving gear 108 mounted on the shaft 109; a pulley 131-1 that is rotatably mounted on the driveshaft 85', a pulley 131-2 rigidly mounted on the shaft 109 and a belt that rotatably connects the pulleys; a pair of clutch disc means 137 that is slidably mounted on the driveshaft 85'; and a solenoid-actuated brake means 134 that grabs the disc means 107.

The pulley 131-1 is fitted with a friction plate on each side surface. The clutch disc means 137 is fitted with clutch driver plate, a solenoid, and a spring means 139 that pulls the clutch disc means 137 away from the pulley 131-1. During the time period in which the clutch disc means is activated, the solenoid clutch means 137 firmly hold the friction plates of the pulley 131-1, and thus rotatably connect the driveshaft 85' and the auxiliary transmission means 72A' (or 72B').

The ratio of the disc means 107 and the disc means driver 108 are such that the disc means 107 will rotate at a rate faster than the mean rotational speed of the auxiliary transmission means 72A' (or 72B'). If the clutch disc means 137 of the A part and the B part are activated simultaneously and the driveshaft 85' and the disc means 107 are connected for a full rotation of the drive shaft 85', the disc means 107 of both A part and B part will rotate forward in relation to the auxiliary transmission means 72A' and 72B' so that the piston pin holding nut 101 of the A part and that of the B part will move radially outward (or upward) by the same amount. To move the piston pin holding nut 101 of both A part and B part inward, the brake 134 of both A part and the B part are activated for the same duration of time.

The VCR control means 103A 9 and 103B) includes a sensor that detects the exact location of the 101-Y part of the piston pin holding nut 101 in the elongated opening 104. The reading of the sensor will be used in controlling actuation of the clutch disc means 137.

Reference is now made to FIGS. 19 through 27 showing a variable cylinder mechanism included in another alternative embodiment of the present invention. The rotary piston engine as described here in the specifications of the present invention does not have cylinders, but instead it has vessels. We use the expression "cylinder" instead of "vessel" because we think that "variable cylinder mechanism" should be able to convey what it is better than "variable vessel mechanism" can. The variable cylinder mechanism enables to halve the number of operating pistons in each of the piston assemblies. During the reduced-cylinder-mode, in which the number of the number of operating pistons is one half of the pistons in the working chamber; the intake and exhaust ports will be kept in the open state; the air fuel mixture will not be sent to the intake port; and no spark-ignition will take place.

The variable cylinder mechanism includes an intake port valve control mechanism that controls the intake port valve 54-V"; an exhaust port valve control mechanism that controls the exhaust port valve 56-V"; and a switch mechanism 120. The intake port valve control mechanism of the piston assembly 30" includes a ring-shaped cam 57-X" that is sandwiched by the guide rails 111-X and 111-Y, and a ring-shaped cam 57-Y" sandwiched by the guide rails 111-Y and 111-Z. The exhaust port valve control mechanism of the piston assembly 30" includes a ring-shaped cam 63-X" sandwiched by the guide rails 112-X and 112-Y, and a ring-shaped cam 63-Y" sandwiched by the guide rails 112-Y and 112-Z. The guide rails keep the roller engaged with the ring-shaped cam sandwiched by them while it rolls on it.

These ring-shaped cams have "high" segments, "low" segments and transition segments. We say that the state of the cam is "high" in the "high" segment, and the state of the cam is "low" in the "low" segment. In the eight-piston engine, the state of the ring-shaped cam 57-X" is generally "high" in the segments 62-C1 and 62-C2 in which the intake activity takes place during the time period the engine is operated with eight cylinders. The state of the ring-shaped cam 63-X" is generally "high" in the segments 62-B1 and 62-B2 in which the exhaust activity takes place during the time period the engine is operated with eight cylinders. The state of the ring-shaped cam 57-Y" is generally "high" in the segments 62-C1, and 62-A2, 62-B2, 62-C2, and 62-D2. The state of the ring-shaped cam 63-Y" is generally "high" in the segments 62-B1, 62-A2, 62-B2, 62-C2, and 62-D2. The intake and exhaust valves are kept open in the segments 62-A2, 62-B2, 62-C2, and 62-D2 during the time period the engine is operated with four cylinders (see FIG. 20).

Figure 20:
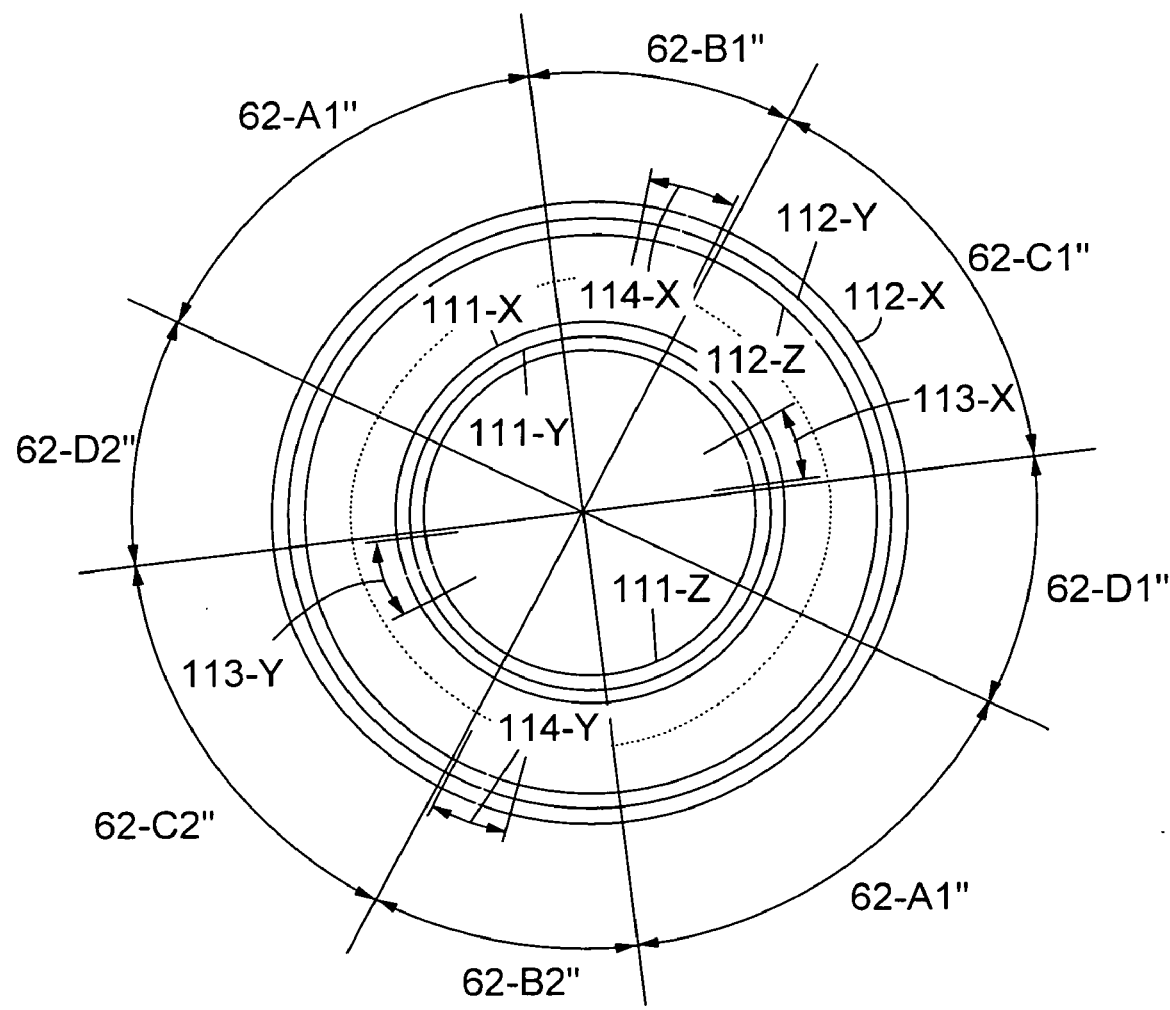
FIG. 20 is a schematic diagram showing guide rails of ring-shaped cams used in the alternative embodiment that includes the variable cylinder mechanism taken along the E-E of FIG. 19 excepting the dotted line portion.
Figure 21:
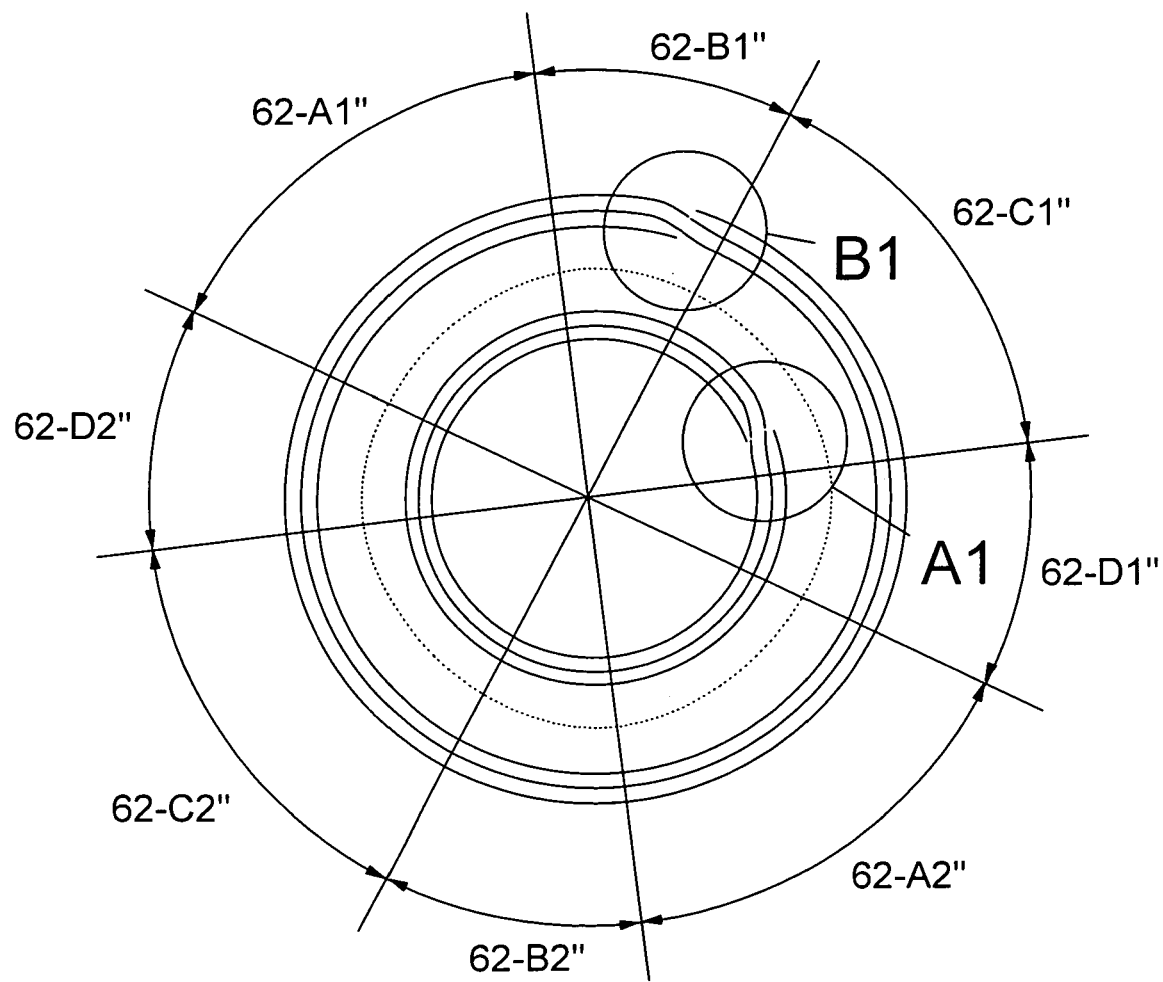
FIG. 21 is a schematic diagram showing a state of the switches of the ring-shaped cams taken along E-E of FIG. 20 in circles A1 and B1 while the number of cylinders is reduced from 8 to 4.
Figure 22:
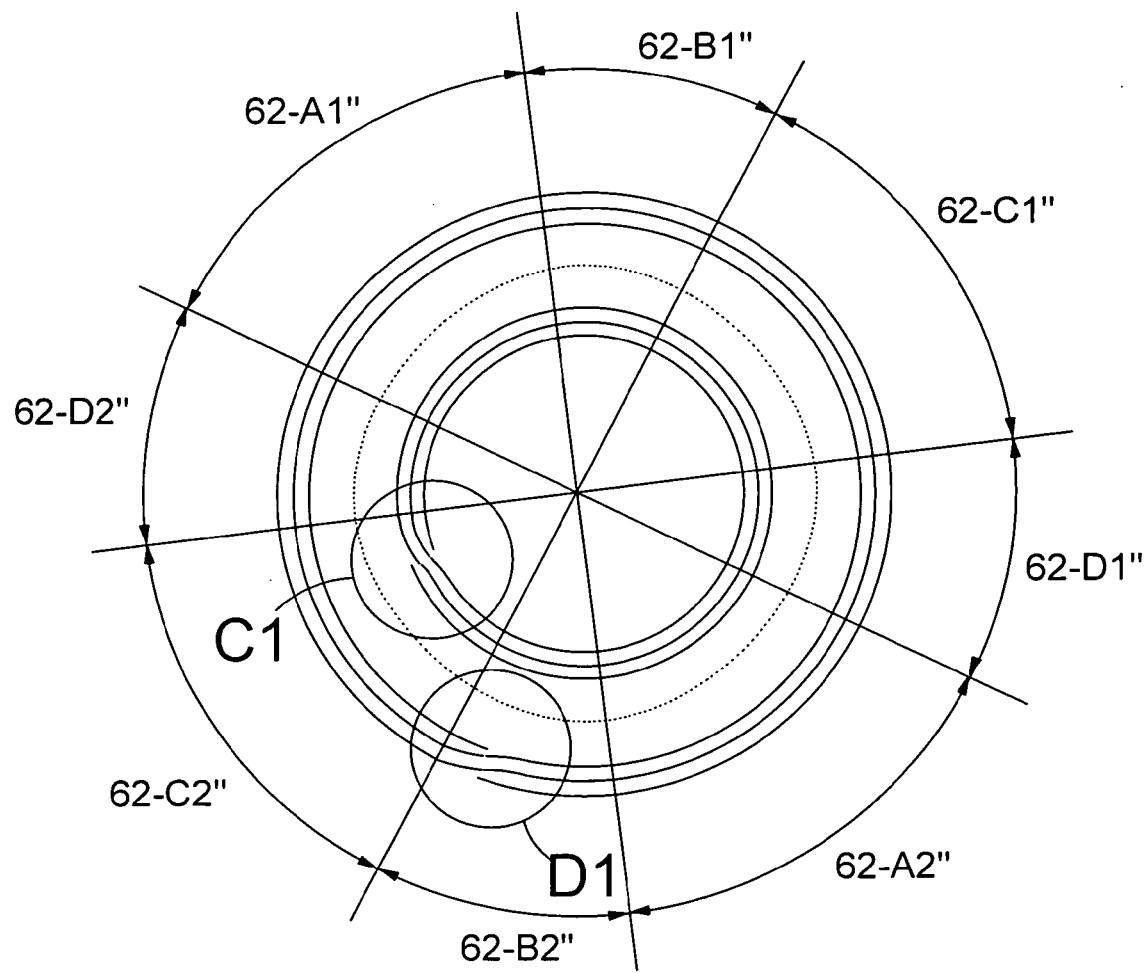
FIG. 22 is a schematic diagram showing a state of the switches of the ring-shaped cams taken along E-E of FIG. 20 in circles C1 and D1, while the number of cylinders is increased from 4 to 8.

As shown in FIG. 20, the ring-shaped cams 57-X" and 57-Y" and the guide rails 111-X, 111-Y, and 111-Z have two switch segments 113-X and 113-Y. The switch segment 113-X is located in the segment 62-C1" in which the intake activity takes place, and the switch segment 113-Y is located in the segment 62-C2" in which the intake activity takes place. In the switch segment 113-X, the roller 31" that is affixed to the arm to control the intake valve 54-V" is able to switch from the cam 57-X" to 57-Y", and in the switch segment 113-Y, the roller 31" is able to switch from the cam 57-Y" to the cam 57-X".

The ring-shaped cams 63-X" and 63-Y" and the guide rails 112-X, 112-Y, and 112-Z have two switch segments 114-X and 114-Y. The switch segment 114-X is located in the segment 62-B1" where the exhaust activity takes place, and the switch segment 114-Y is located in the segment 62-B2" where the exhaust activity takes place. In the switch segment 114-X the roller that is affixed to the arm to control the exhaust valve 56-V" is able to switch from the cam 63-X" to the cam 63-Y", and in the switch segment 114-Y the roller that is affixed to the arm to control the exhaust valve 56-V" is able to switch from the cam 63-Y" to the cam 63-X".

Figure 27:
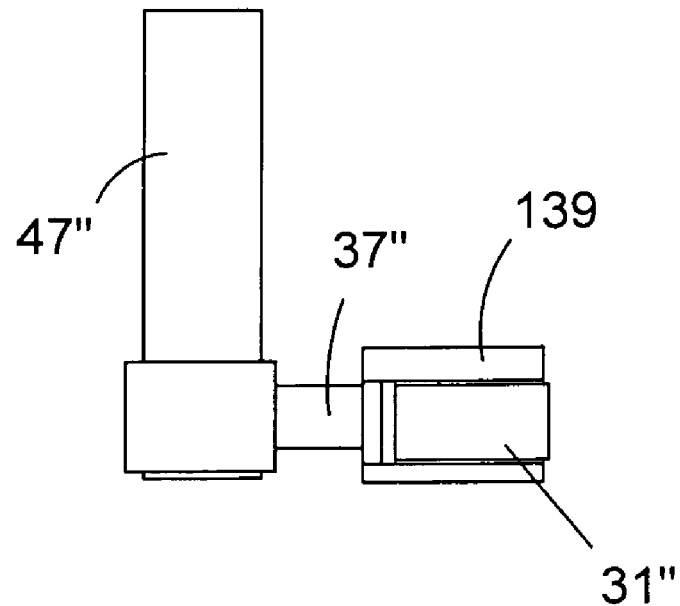
FIG. 27 shows enlarged side and top views of the roller affixed to the shaft of the frustoconical intake control valve.
Figure 27:
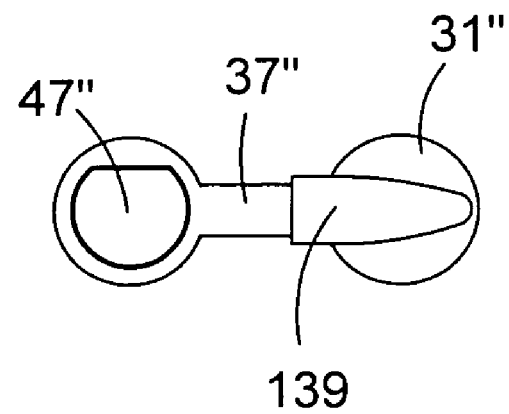

The shaft 47" that shares the pivotal axis with the frustoconical intake port valve is fitted with the arm with a roller 31" and is slidably received by the partially cylindrical hole in the intake port valve 54" (see FIG. 27). The roller 31" is held by a holder 139, which slides along the guide rails 111-X and 111-Y, or 111-Y and 111-Z. The shaft 47" with the roller is able to move within the part cylindrical hole radially inward or outward in the switch segments 113-X and 113-Y.

Referring to FIGS. 23 through 26, the switch mechanism 120 is a part of the variable cylinder mechanism that includes two switches, each of which switches includes a set of movable guide rails in the switch segment, and switch throwing means. Outside the switch segment, the guide rail 111-X comprises two elastic metal tapes 128 and 129 affixed to a plurality of guide rail support pins 135 (see FIG. 23). The guide rails 111-Y and 111-Z are constructed generally in the same manner as the guide rail 111-X is constructed. The switch segment 113-X is divided into the A part and the B part.

Figure 23:
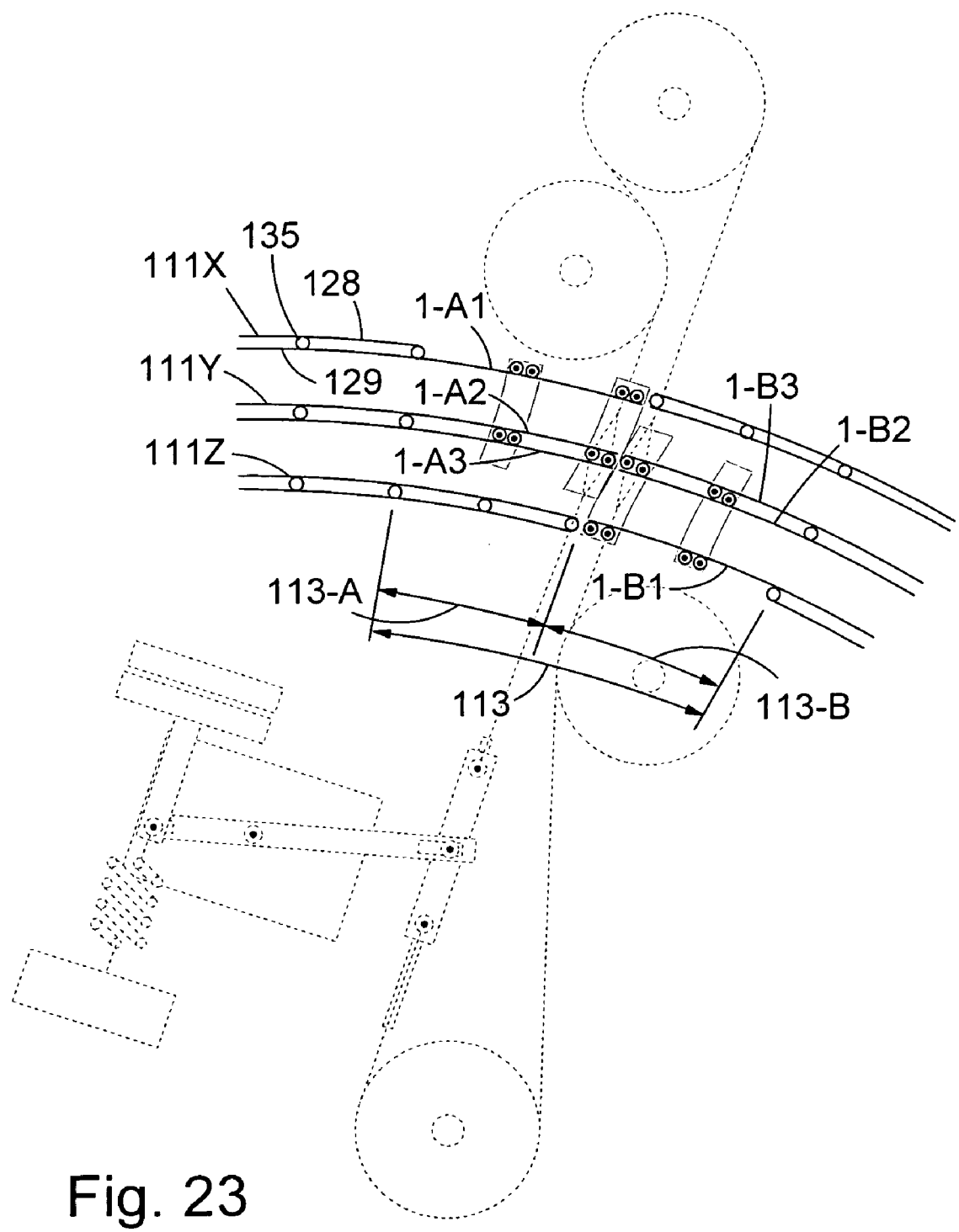
FIG. 23 is a schematic view of the switching mechanism of the guide rails of the ring-shaped cams with the emphasis on the guide means.
Figure 24:
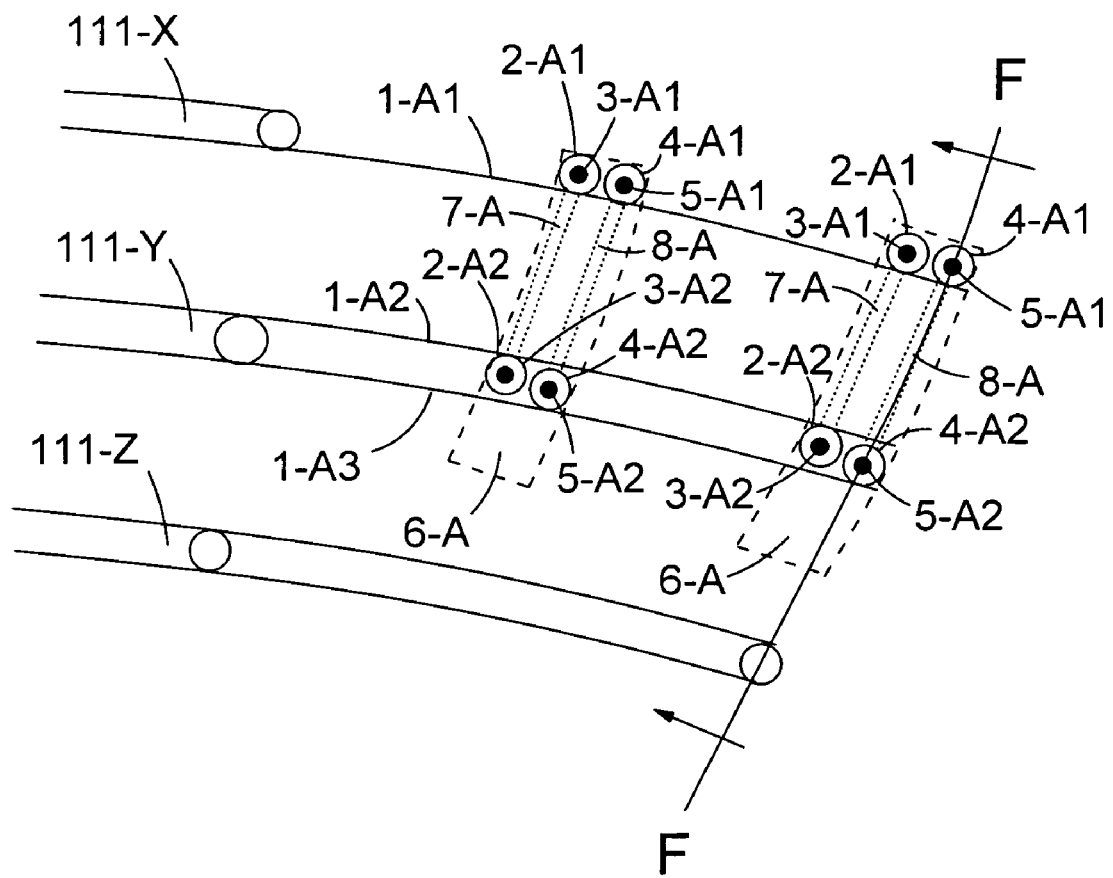
FIG. 24 is an enlarged cross sectional view of the switch point of the guide rails.
Figure 25:
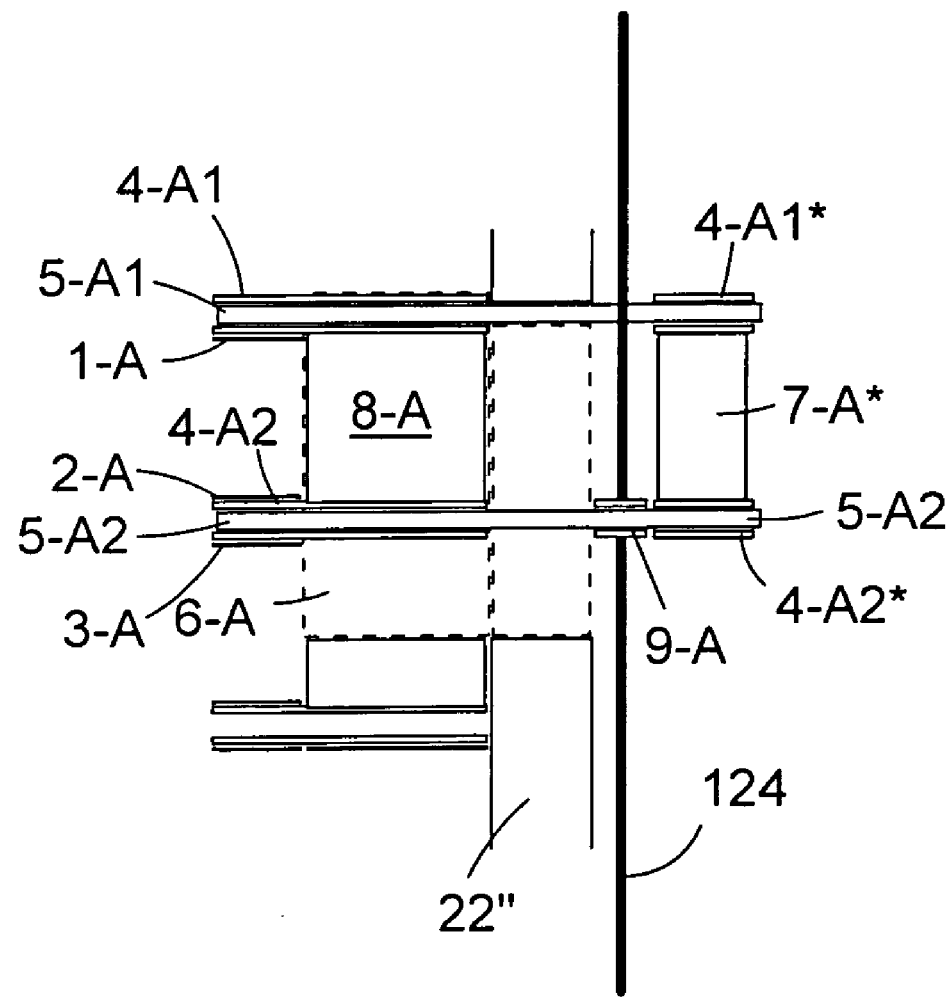
FIG. 25 is an enlarged cross sectional view of the switch point of the guide rails taken along F-F of FIG. 24.

Referring to FIGS. 23 through 25, the A part of the switch segment, or the switch A, includes a radially inwardly bendable elastic metal tape 1-A1 that is an extension of a part of the elastic tape 129, a plurality of metal tubes 2-A1 affixed to the metal tape 1-A1 into each of which tubes a pin 3-A1 is inserted; a bendable elastic tape 1-A2 that is an extension of the radially outer elastic tapes of the guide rail 111-Y, a plurality of metal tubes 2-A2 affixed to the metal tape 1-A2 into each of which tubes a pin 3-A2 is inserted; a bendable elastic tape 1-A3 that is an extension of the radially inner elastic tapes of the guide rail 111-Y, a plurality of metal tubes 4-A2 affixed to the metal tape 1-A3 into each of which metal tubes a pin 5-A2 is inserted; a connecting means 7-A affixed to the metal tube 2-A1 in one end and to the metal tube 2-A2 in the other end; a connecting means 8-A affixed to the metal tube 4-A1 in one end and to the metal tube 4-A2 in the other end; and a crevice 6-A cut in the "high" segment of the cams 57-X" and 57-Y" to hold the connecting means 7-A and 8-A within. The B part of the switch segment, which constitutes the switch B, is generally identical to the switch A, except that the elastic metal tapes that are extensions of the elastic tapes of the guide rails 111-Y and 111-Z are outward bendable in the switch B.

Figure 26:
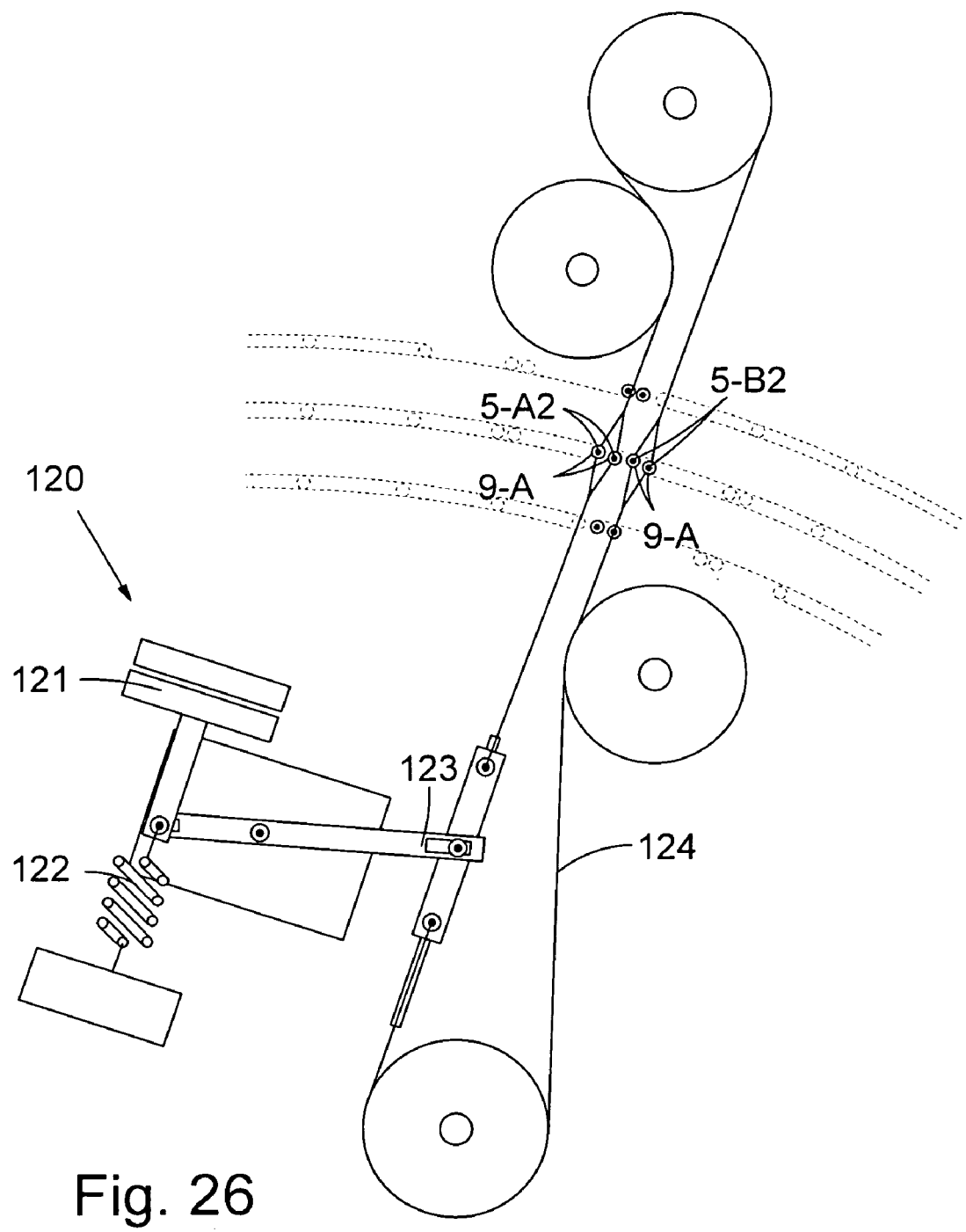
FIG. 26 is a schematic view of a switching mechanism of the guide rails of the ring-shaped cams with the emphasis on the switching means.

As shown in FIG. 26, the switch throwing means 120 includes a lever and fulcrum means 123, a solenoid means 121 affixed to the one end of the lever and fulcrum means 123 and throws the switches A and B; a spring means 122 that throws back the switches A and B to the "straight" position and keeps the switches in the "straight" position affixed to the opposite side of the solenoid means 121 of the lever and the fulcrum means 123; a wire-and-pulleys means 124 affixed to another end of the lever and the fulcrum means 123 and to a metal ring 9-A mounted on the pin 5-A2 at the switch point of the switch A and to a metal ring 9-B mounted on the pin 5-B2 at the switch point of the switch B. The wire-and-pulleys means 124 interlocks the switch A and switch B, and the switch A and the switch B are always thrown together.

The switch mechanisms used in the switch segments 113-Y, 114-X and 114-Y are generally identical to that used in the switch segment 113-X except that the directions of the switch thrown in the switch segments 113-Y and 114-Y are opposite to those in the in the switch segment 113-X.

The working chamber assembly and the connecting means are cooled and lubricated by cooling and lubrication means. The oil delivery system includes oil bores, an oil outlet, oil gutters, an oil pump, and an oil pan. The cooling and lubrication oil is pumped into the working chamber through an oil bore, which extends along the rotational axis 40 of the inner piston shaft 38, and into the oil jacket in the sidewalls of the working chamber assembly housing 22. The oil carried by the bores is diverted into radially extending plurality of bores. Some of the radially extending oil bores deliver oil to the internal cavity of the hollow piston assembly 32, and the other oil bores deliver oil to internal cavity of the hollow piston assembly 30 via depressions made on the internal wall of the tubular piston shaft 36, and oil bores that extend radially from the internal cavities. Lubrication of the piston rings is done by the oil overflowed from the internal depressions. The oil that circulated through the piston assemblies 30 and 32 shoots out from the oil outlet 59 into the oil gutter 71 (see FIGS. 2, and 9) that extends along the outermost periphery of the internal wall of the working chamber assembly housing, and is recycled back to the oil pan and oil pump.

The first power terminal is affixed to the external wall of the tubular shaft 36, and the second power terminal is affixed to the external wall of the inner shaft 38. The spark plugs in the piston heads 30A1 cavities are connected to the first power terminal, and the spark plugs in the piston heads 32A1 cavities are connected to the second power terminal.

An alternative embodiment of the piston assembly 30* includes the piston 30A* affixed to the piston hub 30C* and the piston 32A* affixed to the piston hub 32C*.

Another alternative embodiment includes the connecting means that is equipped with only one of the internal gear-planetary gear sets; i.e., either internal gear 83A and the planetary gears 78A, or the internal gear 83B and the planetary gears 78B. In the transmission part that does not include the planetary gear, a crank arm (instead of the planetary gear) is rigidly mounted on the planetary gear shaft, and the connecting rod is pivotably connected to the crank arm. Another alternative design of the connecting means includes the planetary gears of the transmission parts A and B that do not share the same gear shaft.

Another alternative embodiment includes the means for transmitting variable speed rotation of an alternative design that comprises a set of non-circular gears named the Sakita gears shown in U.S. Pat. No. 6,446,595 by Sakita, the inventor of the present invention.

In an alternative embodiment that includes another the variable compression ratio mechanism 100*, the pulley ratios of the pulleys 131-1* and 131-2* are adjusted in such a manner that the rotational speed of the disc means 107* will be the mean rotational speed of the auxiliary transmission means 72A* (or 72B*), and that the elongated hole 104* in the disc means 102B* is cut in the reverse direction of that in the disc means 102B* so that when the driveshaft 85* and the disc means 107* of both A part and the B part are rotatably connected, the piston pin holding nut 101* of the A part and the B part will move in the same direction. This alternative embodiment does not need brakes 134***.

The invention having been described in detail in accordance with the requirements of the U.S. Patent Statutes, various other changes and modification will suggest themselves to those skilled in this art. For example, the number of pistons attached to a piston assembly may not be limited to two or four. Similarly, the number of the planetary gears may be as many or as few as practicable, and the connecting rod may be as long or short as practicable. The connecting means may use sprockets and chains instead of the circular main transmission gear set. The spark plug may be affixed to the opposite end of the piston head, or each piston head may have two spark plugs at each end of it. It is intended that the above and other such changes and modifications shall fall within the spirit and scope of the invention defined in the appended claims.

I claim:

1. An internal combustion engine comprising
 a working chamber assembly including first and second piston assemblies each of which assemblies having at least one pair of diametrically opposed pistons rotatable about a rotational axis of said piston assemblies,
 a means for interconnecting said first and second piston assemblies for variable-speed rotation in same direction during recurrent periods of rotation,
 a working chamber assembly housing, a connecting means housing, and a cooling and lubrication means, wherein
 said piston having a piston head and a piston vessel,
 said piston head of said first piston assembly received by said piston vessel of said second piston assembly,
 said piston head of said first piston assembly and said piston vessel of said second piston assembly together form a first working chamber,
 said piston head of said second piston assembly received by said piston vessel of said first piston assembly,
 said piston head of said second piston assembly and said piston vessel of said first piston assembly together form a second working chamber,
 said piston vessel includes an intake port and a frustoconical rotary intake port valve, and
 said piston vessel includes an exhaust port and a frustoconical rotary exhaust port valve.

2. An internal combustion engine as defined in claim 1 wherein
 said working chamber assembly includes an intake system and an exhaust system.

3. An internal combustion engine as defined in claim 1 wherein
 said piston includes a spark plug, and
 said working chamber assembly housing includes a hole made for accessing said spark plug.

4. An internal combustion engine as defined in claim 1 wherein
 said means for interconnecting said first and second piston assemblies including a main transmission means, first and second auxiliary transmission means, and first and second internal gears affixed to internal wall of said connecting means housing, said main transmission means comprising first and second transmission parts and a main transmission gear set, said first and second transmission parts including a plurality of planetary gears, each of said first and second transmission parts including a plurality of crank mechanisms wherein each of said crank mechanisms comprises a connecting rod, a piston pin, and a crank pin, said planetary gear being rotatably connected to said crank mechanisms, said first auxiliary transmission means connected to said first piston assembly, and said second auxiliary transmission means connected to said second piston assembly.

5. An internal combustion engine as defined in claim 1 wherein
said piston has an oil outlet at its outermost part through which used cooling oil is exhausted.

6. An internal combustion engine as defined in claim 1 wherein
said working chamber assembly housing having an internal wall, and
said cooling and lubrication means includes an oil gutter that extends along outermost periphery of said internal wall of said working chamber assembly housing.

7. An internal combustion engine as defined in claim 1 wherein
said internal combustion engine includes a means to attain a variable compression ratio.

8. An internal combustion engine as defined in claim 1 wherein
said internal combustion engine includes a variable cylinder mechanism wherein
said variable cylinder mechanism enables changing number of operating pistons.

9. An internal combustion engine comprising
a working chamber assembly including first and second piston assemblies each of which assemblies having at least one pair of diametrically opposed pistons rotatable about a rotational axis of said piston assemblies,
a means for interconnecting said first and second piston assemblies for variable-speed rotation in same direction during recurrent periods of rotation,
a working chamber assembly housing, a connecting means housing, and a cooling and lubrication means, wherein
said first and second piston assemblies including said pistons having internal cavities,
said piston includes an oil outlet located at outermost part,
said working chamber assembly housing having an internal wall, and
said cooling and lubrication means includes an oil gutter that extends along outermost periphery of said internal wall of said working chamber assembly housing,
said means for interconnecting said first and second piston assemblies including a main transmission means, first and second auxiliary transmission means, and first and second internal gears affixed to internal wall of said connecting means housing,
said main transmission means comprising first and second transmission parts and a main transmission gear set,
said first and second transmission parts including a plurality of planetary gears,
each of said first and second transmission parts including a plurality of crank mechanisms wherein each of said crank mechanisms comprises a connecting rod, a piston pin, and a crank pin,
said planetary gear being rotatably connected to said crank mechanisms,
said first auxiliary transmission means connected to said first piston assembly, and
said second auxiliary transmission means connected to said second piston assembly.

10. An internal combustion engine as defined in claim 9 wherein
said internal combustion engine includes a means to attain a variable compression ratio.

11. An internal combustion engine as defined in claim 9 wherein
said internal combustion engine includes a variable cylinder mechanism wherein
said variable cylinder mechanism enables changing number of operating pistons.

12. An internal combustion engine comprising
a working chamber assembly including first and second piston assemblies each of said piston assemblies having at least one pair of diametrically opposed pistons rotatable about a rotational axis of said piston assemblies,
a means for interconnecting said first and second piston assemblies for variable-speed rotation in same direction during recurrent periods of rotation,
a working chamber assembly housing, a connecting means housing, and a cooling and lubrication means, wherein
said connecting means housing having an internal wall,
at least one internal gear affixed to said internal wall,
said means for interconnecting said first and second piston assemblies comprising a main transmission means, and first and second auxiliary transmission means,
said main transmission means comprising a main transmission gear set, and first and second transmission parts,
said main transmission gear set having a main transmission gear and output gear,
said main transmission gear having a hub,
said first and second transmission parts including a plurality of planetary gears,
said planetary gear each rigidly mounted on a shaft,
said shaft of said planetary gear rotatably mounted on said hub of said main transmission gear,
each of said first and second transmission parts including a plurality of crank mechanisms wherein each of said crank mechanisms comprises a connecting rod, a piston pin, and a crank pin,
said internal gear meshes with said planetary gears,
said first piston assembly affixed to an outer piston shaft,
said second piston assembly affixed to an inner piston shaft,
said first auxiliary transmission means affixed to said outer piston shaft, and
said second auxiliary transmission means affixed to said second piston shaft.

13. An internal combustion engine as defined in claim 12 wherein
said piston pin, said crank pin, and said connecting rod transmit variable speed rotation to said first and second piston assemblies,
one end of said connecting rod is pivotably mounted on said piston pin, which is rotatably mounted on said auxiliary transmission means, and the other end of said connecting rod is pivotably mounted on said crank pin that is rotatably mounted on a side of said planetary gear.

14. An internal combustion engine as defined in claim 12 wherein
said working chamber assembly includes an intake system and an exhaust system.

15. An internal combustion engine as defined in claim 12 wherein
   said piston includes a spark plug, and
   said working chamber assembly housing includes a hole made for accessing said spark plug.

16. An internal combustion engine as defined in claim 12 wherein
   said working chamber assembly housing having an internal wall, and
   said cooling and lubrication means includes an oil gutter that extends along an imaginary line that is made up of outermost points of said internal wall of said working chamber assembly housing.

17. An internal combustion engine as defined in claim 12 wherein
   said internal combustion engine includes a means to attain a variable compression ratio.

18. An internal combustion engine as defined in claim 12 wherein
   said internal combustion engine includes a variable cylinder mechanism wherein
   said variable cylinder mechanism enables changing number of operating pistons.

* * * * *